United States Patent [19]

Lang et al.

[11] Patent Number: 5,039,535
[45] Date of Patent: Aug. 13, 1991

[54] METHOD OF COOKING FOOD PRODUCTS

[75] Inventors: Howard A. Lang, Bellevue; Richard E. Wendorf, Bothell; George E. Sage, Redmond, all of Wash.

[73] Assignee: Lang Manufacturing Company, Redmond, Wash.

[21] Appl. No.: 401,950

[22] Filed: Aug. 31, 1989

Related U.S. Application Data

[62] Division of Ser. No. 143,795, Jan. 14, 1988, abandoned.

[51] Int. Cl.⁵ .......................... A23L 1/00; A47J 49/00
[52] U.S. Cl. ...................................... 426/233; 99/328; 99/333; 426/523
[58] Field of Search ............... 426/233, 231, 523, 243; 99/326, 328, 333; 219/385, 388, 343, 448, 449, 492; 364/400

[56] References Cited

U.S. PATENT DOCUMENTS

| | | | |
|---|---|---|---|
| 1,346,793 | 1/1920 | Bunnell et al. | 219/448 |
| 3,313,917 | 4/1967 | Ditzler et al. | 219/343 |
| 3,483,813 | 12/1969 | Noel | 219/385 |
| 3,932,732 | 1/1976 | McAllister et al. | 235/92 CT |
| 4,238,995 | 12/1980 | Polster | 99/331 |
| 4,362,094 | 12/1982 | Polster | 99/342 |
| 4,447,693 | 5/1984 | Buck | 426/243 |
| 4,486,648 | 12/1984 | Grasso | 219/448 |
| 4,493,981 | 1/1985 | Payne | 219/492 |
| 4,503,320 | 3/1985 | Polster | 99/330 |
| 4,506,995 | 3/1985 | Polster | 99/342 |
| 4,554,437 | 11/1985 | Wagner et al. | 219/388 |
| 4,692,596 | 9/1987 | Payne | 219/449 |

Primary Examiner—George Yeung
Attorney, Agent, or Firm—Seed and Berry

[57] ABSTRACT

An oven for cooking a food product that is exactly controlled for various cooking parameters, including cooking time, temperature, cooking elements used and cooking element duty cycle. Top and bottom cooking elements are provided in the oven. Temperature sensors are placed between each cooking element and the food product. The oven temperature is sensed when the food product is placed in the oven. The type of food product placed in the oven is indicated by the baker a control panel. Previously stored data indicates the cooking parameters to provide the best possible food product. The microprocessor controls the cooking elements to cook the food product according to the cooking parameters. As the correct cooking temperature is approached, the duty cycle of the cooking elements is lowered to ensure that the proper temperature is not exceeded. Once the correct cooking temperature is reached, the cooking elements operate at a predetermined duty cycle for the remaining cooking time. An indication is provided that the food product is done and the food product is removed from the oven. Openings are provided in the oven to permit heat to escape and to permit the food product to be removed from the front or back of the oven.

15 Claims, 18 Drawing Sheets

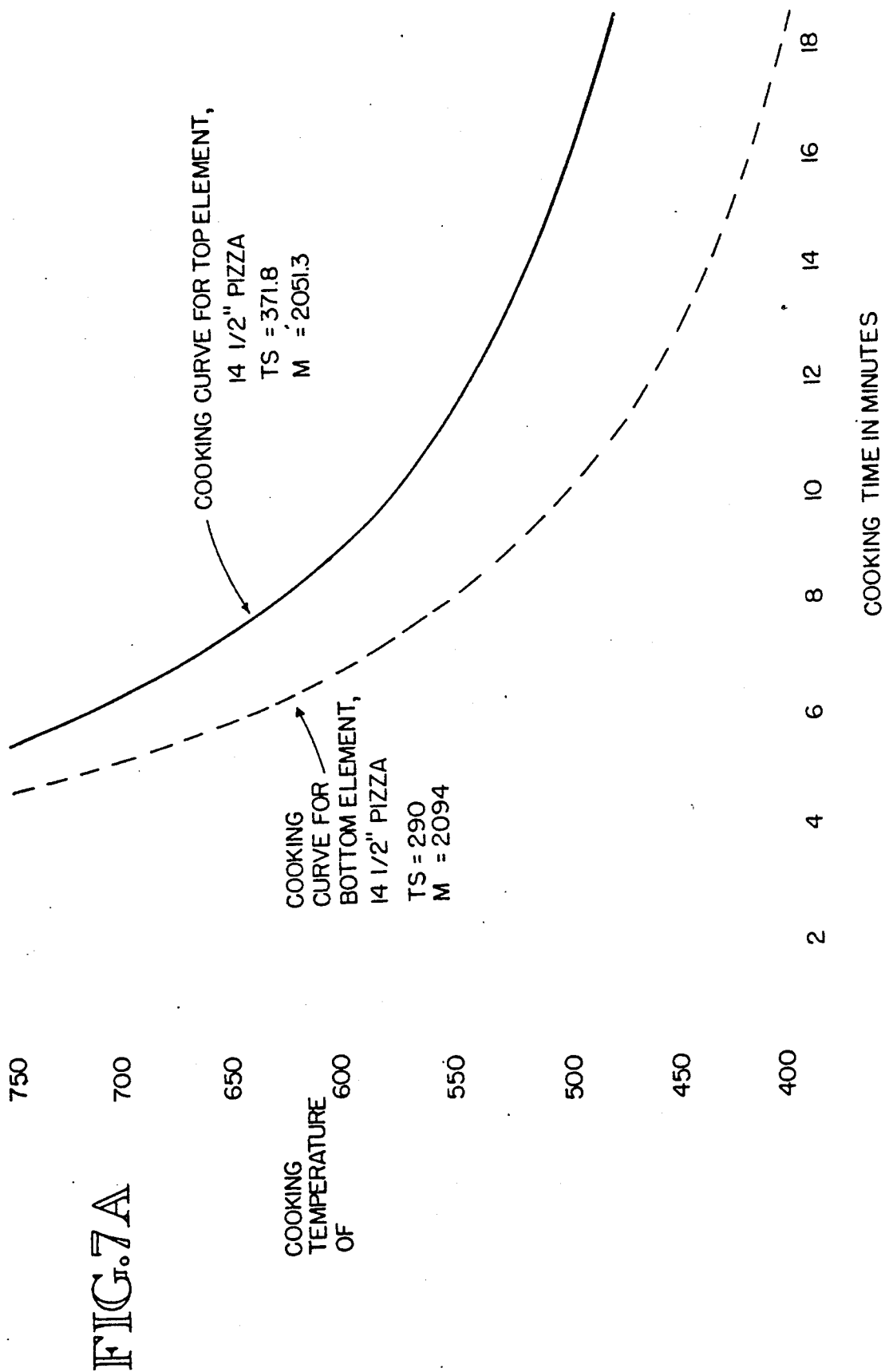

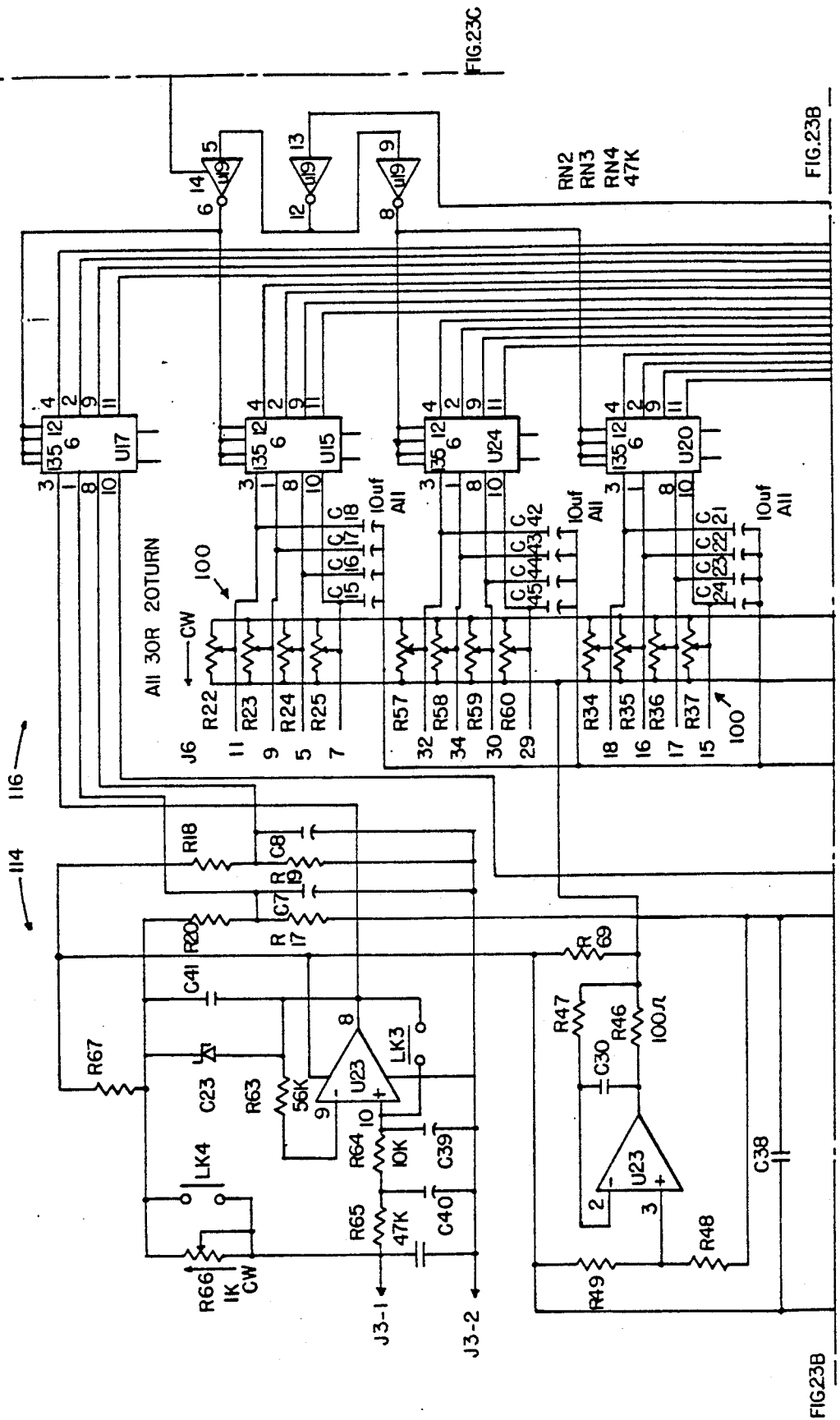

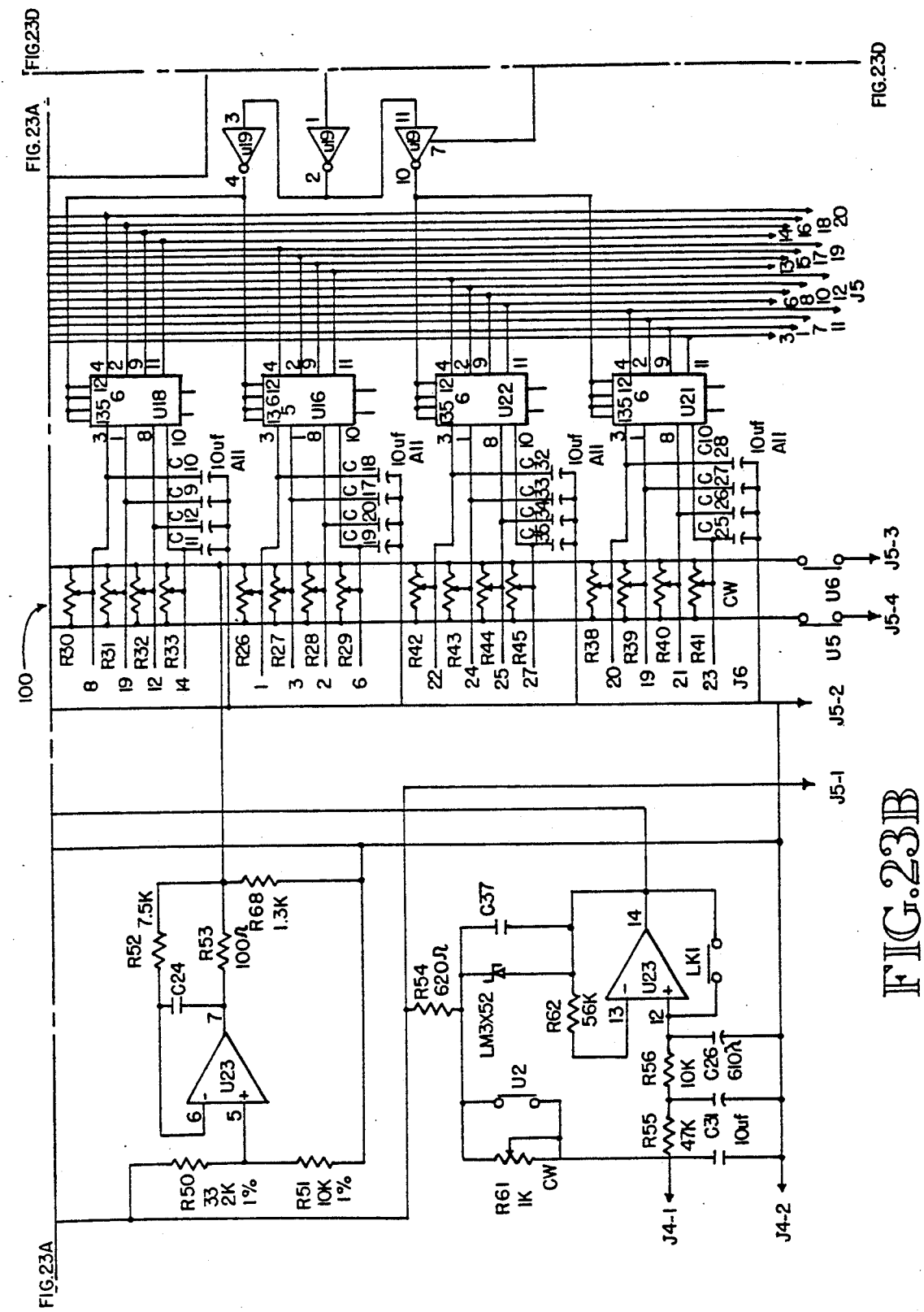

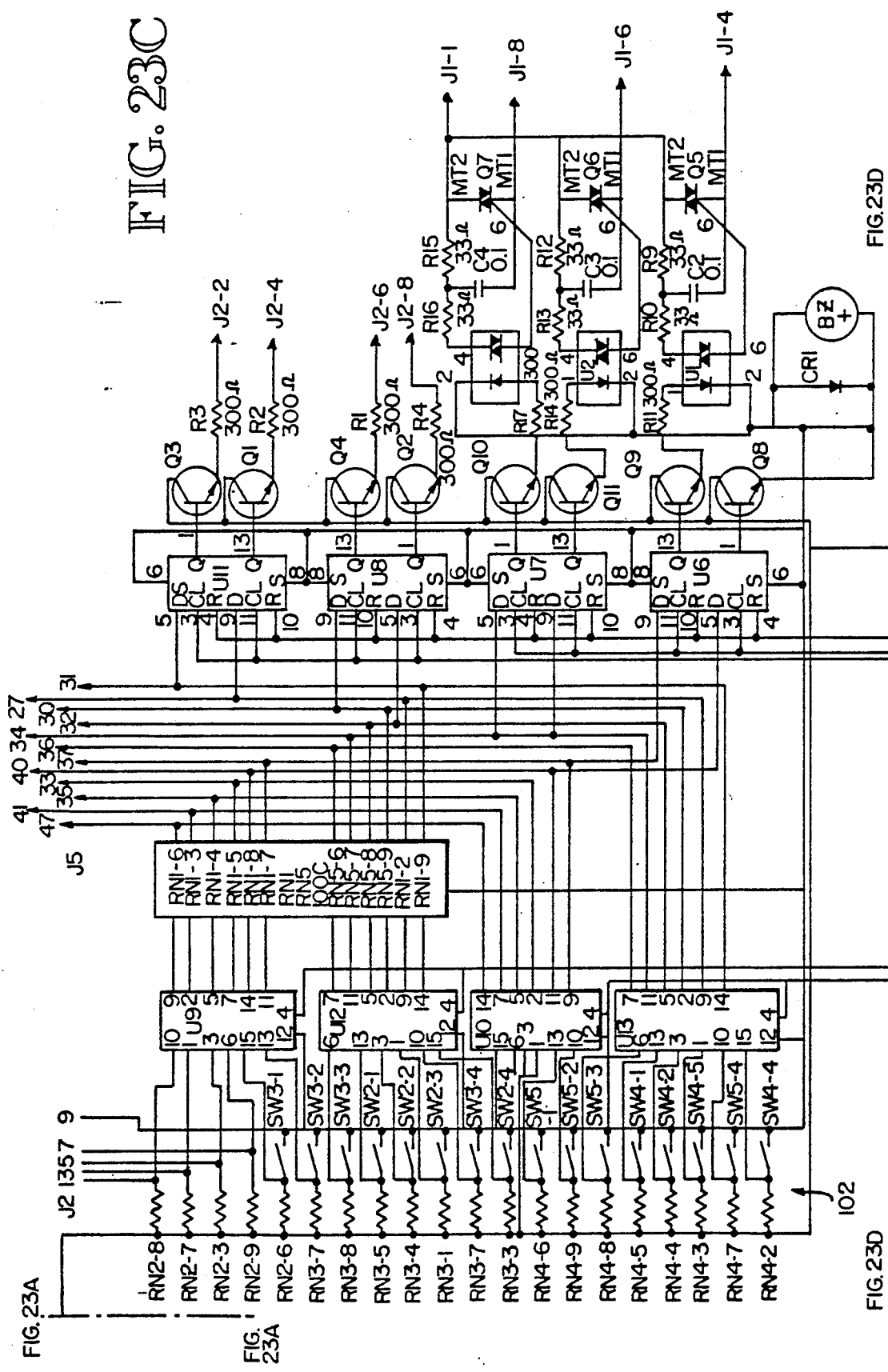

METHOD OF COOKING FOOD PRODUCTS

This application is a division of U.S. patent application Ser. No. 07/143,795, filed Jan. 14, 1988, now abandoned.

TECHNICAL FIELD

This invention relates to pizza ovens and to methods of cooking pizzas and, more particularly, to ovens and methods of cooking pizzas which take into account oven heat-up time, pizza size, pizza type, etc., when cooking a pizza.

BACKGROUND OF THE INVENTION

Serving a pizza that is most pleasing to the customers is a goal of many restaurants. In serving the best pizza, one that is pleasing to the most customers, the flavor, aroma, aesthetic appeal and other factors are important. To obtain a pizza with pleasing taste, aroma and aesthetic appeal, the oven in which the pizza is cooked and the way the pizza is cooked are important factors The type of oven used to cook the pizza has a significant impact on the method of cooking and on the final flavor and aesthetic appeal Presently, a large oven that is capable of cooking many pizzas at the same time is used in many restaurants. These ovens have a large mass, metal cooking surface on which the pizzas are placed. The oven is heated with gas or electricity. The large mass, metal cooking surface is designed to provide even heat along its entire surface at all times. The oven is constructed to ensure that the entire oven is a uniform temperature throughout at all times.

One disadvantage of this type of oven is that properly cooking a pizza requires considerable skill. A large pizza requires more cooking time than a small pizza. A deep pan pizza cooks considerably different than regular pizza. A combination pizza, having many ingredients, such as green peppers, anchovies, pineapple, onions, sausage, etc., requires more cooking time than a cheese-only pizza. The baker cooking the pizzas must ensure that each pizza is cooked the proper amount of time such that the pizza is done but is not burned. This job is made more difficult when numerous pizzas of different styles and toppings are placed in the oven at different times so that the baker must monitor each pizza to ensure that it is properly cooked. Considerable skill is required to properly cook a pizza in this type of oven. Further, significant time and effort are required to adequately train a baker to properly cook all types of pizzas. This is a significant disadvantage for this type of oven.

A further disadvantage is the time and cost to operate the oven. The heating of the large oven to the proper temperature requires considerable energy, which is expensive. Heating the oven each day for cooking pizzas must often start several hours before the first pizza is to be placed in the oven. Maintaining the large oven at this temperature is also expensive. This is particularly uneconomical when only a few pizzas are cooked all day or during a slower part of the day, such as from 2:00 p.m. until 5:30 p.m.

A second type of oven used by restaurants to cook pizzas is an oven having a moving conveyor belt. This type of oven has a conveyor belt which continuously moves through the oven at a predetermined speed. The pizzas are placed on this moving belt at a specific location and are taken off the belt as they emerge from the oven. The pizzas are cooked during the time it takes to travel through the oven. The speed of the conveyor belt is set to cook the pizzas a desired amount of time.

A significant disadvantage of the conveyor belt oven is the quality of the cooked pizza. The time taken for a pizza to travel through the oven and the temperature at which it is cooked are the same for each pizza. However, the proper cooking time and temperature for optimum taste is different for each pizza type, whether a large, small, combination or cheese only pizza. While this type of oven requires less operator skill and training then a large mass cooking surface oven, there is a much greater likelihood that pizza baked will be of lower quality. A single oven having several conveyor belts, each moving at a different speed can be manufactured, but there is a practical limit to the number of belts possible and the size and expense becomes prohibitive. The conveyer belt oven also has significant heating time and is expensive to operate.

SUMMARY OF THE INVENTION

It is an object of this invention to provide an oven capable of cooking individual pizzas of various sizes and styles, each pizza being cooked at a predetermined, desired cooking time and temperature for that type of pizza.

It is another object of this invention is provide an oven that includes the oven-start temperature and oven heat-up rate in determining the cooking time for each pizza.

It is another object of this invention to provide an oven having infrared cooking elements that cook the pizza based on a variable on-off duty cycle of the infrared cooking element.

It is another object of this invention to provide a method of cooking a pizza that permits the optimum cooking parameters for each type of pizza to be programmed into the oven and then selected by a baker having low skill in cooking pizzas.

These and other objects, which are described herein, are accomplished by providing an oven having infrared cooking elements on the top and bottom. Openings of a specific size and shape are provided in the front and back sides of the oven. These openings are of the correct size and shape to permit the pizza to be removed from either side and to permit a certain amount of heat to escape from the oven while the pizza is being cooked. Each cooking element is individually controllable for cooking parameters, such as cooking time, duty cycle and temperature. The cooking parameters are programmable into an electronic control unit that may include a memory and a microprocessor. Desired cooking parameters for numerous types of pizzas are programmed into and stored in the oven. When cooking a pizza, the baker places the pizza in the oven and pushes a button to indicate to the oven the type of pizza in the oven. The oven then cooks the pizza according to the preprogrammed cooking parameters and indicates when the pizza is done.

When cooking the pizza, the oven takes into account the temperature of the oven when the pizza was placed in the oven. The oven calculates the cooking time that elapses while the oven is heating up to a final cooking temperature and the amount the pizza is cooked during this heating time. The infrared cooking elements operate on a variable duty cycle to ensure that the final cooking temperature is not significantly exceeded. The variable duty cycle of the cooking elements also ensures that each pizza is neither overcooked nor undercooked and that all pizzas are cooked uniformly with respect to each other. The duty cycle of each element is varied according to the final cooking temperature and how close that element is to the final cooking temperature.

In one embodiment, a side cooking element is provided to ensure that the edges of the pizza are properly cooked. The cooking surface is rotated to move the pizza edge past the side cooking element at a uniform rate. The side cooking element is operated at a specific duty cycle.

BRIEF DESCRIPTION OF THE DRAWINGS

FIG. 7A is a graph showing two cooking curves used with the invention.

FIGS. 23A–23D are schematics of the interface board showing the electrical connection between the ovens, control logic and various other parts of the electronic control unit used in the invention.

DETAILED DESCRIPTION OF THE INVENTION

There are many different types of pizza that must each be cooked differently for each to have an optimum final taste, aroma and aesthetic appeal. Each type of pizza is made with a different dough that has different cooking characteristics. Further, some pizzas have thick crusts while others have soft or thin crusts. Some pizzas are deep pan pizzas having many layers of ingredients in addition to the dough. Some pizzas are cheese-only pizzas, while others have green peppers, mushrooms, anchovies or other ingredients that cook very differently than cheese or dough. A cooking temperature that would properly cook a deep pan pizza may burn a thin crust pizza or the green peppers on a combination pizza. These pizzas also come in several sizes.

There are many different types of surfaces on which a pizza may be placed while it is being cooked. Some pizzas are cooked in a metal pan having an edge. The pan and the edge retain significant heat and act to cook the pizza by contact with hot metal. The shape and density of the pan must be taken into account to properly cook a pizza. Some pizzas are cooked on a flat metal screen having no edges and numerous small holes in the metal sheet. This type of pizza requires a different heating pattern to properly cook the pizza than that used for a deep pan pizza. Some types of pizzas are cooked without using a pan and are placed directly on a non-metal cooking surface or in a pan that does not retain or conduct heat. The cooking parameters must be properly adjusted according to the type of pan used to cook the pizza.

The present invention permits restaurants to properly cook many different types of pizzas. The oven contains cooking elements that are exactly controlled by an electronic control unit to cook the pizza for a desired time at a desired temperature. Cooking parameters include time in the oven, time cooked at each temperature, duty cycle of the cooking elements, final cooking temperature, standby temperature, which cooking elements are used, and other oven controlled factors. The cooking parameters are exactly controlled by an electronic microprocessor control unit for each oven. The necessary values to permit the oven to determine the correct cooking parameters are programmed into the oven. This permits a baker to place a pizza in the oven, push a button corresponding to that pizza type and size, and remove the pizza from the oven when the oven indicates that the pizza is done. Baker skill is minimized compared to previous ovens.

Oven Construction

Figure 1:
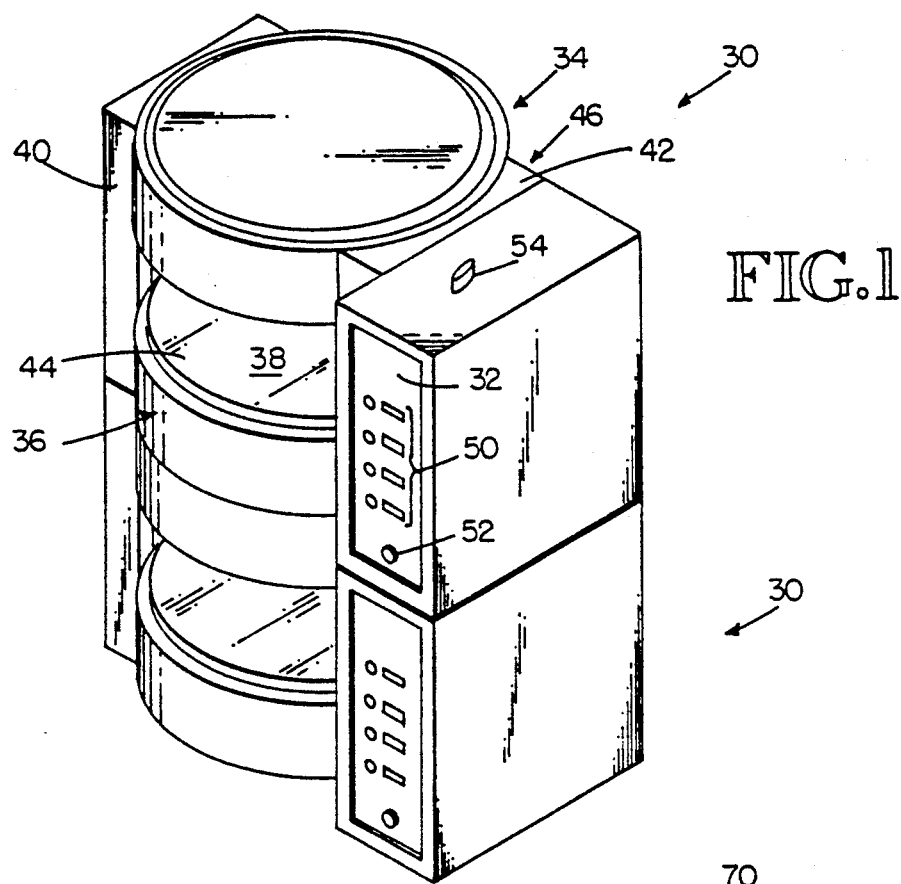
FIG. 1 is an isometric view of two of the ovens of the present invention, one stacked on top of the other.

Two ovens for cooking pizzas, one stacked on top of the other, are shown in FIG. 1. Each oven, denoted generally as 30, has a control panel 32. The oven 30 has a top portion 34, a bottom portion 36, and a cooking surface 38 on which the pizza is placed while it is cooking. The oven includes left and right side supporting and insulating sections 40 and 42, respectively. The oven has a front opening 44 and a rear opening 46. The openings are made large enough to permit the largest sized pizza intended to be cooked therein to be placed in and removed from either opening. This provides a pass-through feature. A pizza to be cooked may be placed in the oven from either the front or the back. When the pizza is fully cooked, it is removed from either the front or back. This pass-through feature permits a baker to place a pizza in the rear of the oven and start baking it. A server on the other side of the oven may remove it from the front of the oven when it is fully cooked and then serve it to a customer.

The openings are made large enough to permit heat to escape from the oven. The size and shape of the openings is determined in conjunction with the rest of the oven design, cooking elements, and insulation, to permit the correct amount of heat to escape from the oven, as explained herein. There are no doors on either opening of the embodiment of the oven shown in FIG. 1; however, if the system requirements were changed, doors or partial doors may be placed on either or both openings.

The control panel 32 includes four buttons 50, one of which the baker presses to indicate to the oven the type of pizza placed in the oven. A power switch 52 is also on the control panel to turn the entire oven on or off. Each button corresponds to one type of pizza whose cooking parameters have been preprogrammed into the oven by the owner. The types of pizza may include large, small, combination, deep pan, cheese-only, thick crust, etc. The control panel also includes a signal, such as lights 53 for each type of pizza, on the front to indicate, together with a buzzer if desired, that a pizza is done and is ready to be removed from the oven. An optional indication light 54 may be provided on the top or back of the oven to permit a server on the other side to see that a pizza is cooked to make the pass-through feature more convenient to use. Four possible cooking selection buttons are shown; however, the control panel could contain additional selection buttons or programming features if desired.

The side supporting and insulating sections 40 and 42 provide structural support to the oven. They also insulate the control panel, electronic control unit and surrounding environment from the heat of the oven. The side sections also contain a side heating element 60 in the alternative embodiment shown in FIGS. 6 and 7. The side sections are insulated to keep a desired amount of heat in the oven and are also designed to permit a certain amount of heat to escape from the oven. If it is required that more heat or less heat escape from the oven, then the insulation or size of the side sections is alterable to provide the .desired heat-retention characteristics of the oven.

Figure 2:
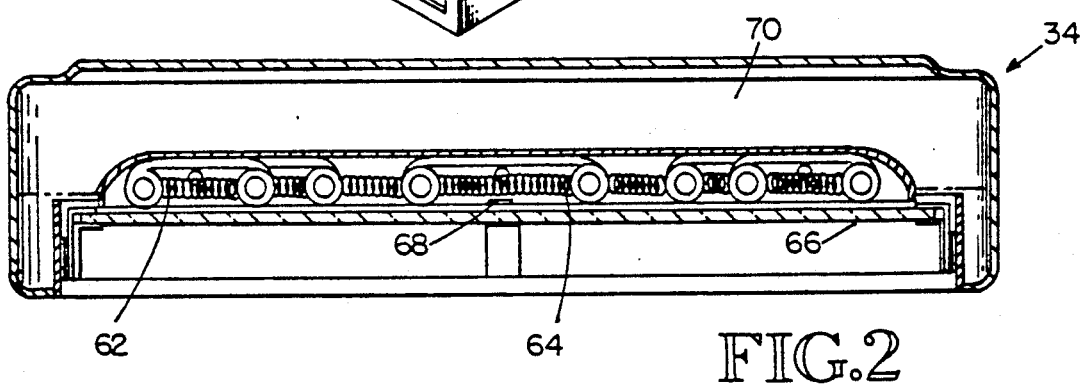
FIG. 2 is a cross-sectional view of a top section of an oven of the present invention.
Figure 4:
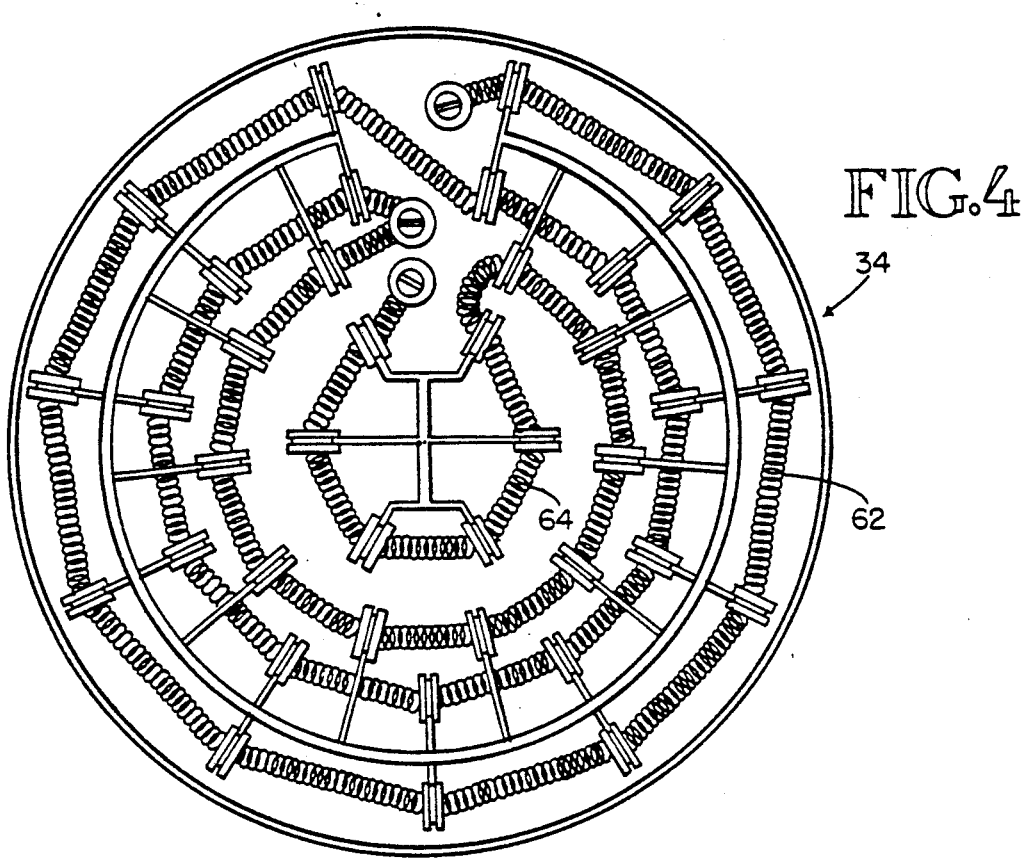
FIG. 4 is a bottom plan view of a top cooking element of the present invention.

Top portion 34 having top cooking elements 62 and 64 is shown in FIGS. 2 and 4. The cooking elements are infrared cooking elements. The elements are selected to heat to the range of 1400°–1450° F. A different element temperature range could be used, for example, approximately 1800° F. could be used, as it provides better penetration, but it does not brown the pizza the desired amount for an aesthetic looking pizza. For cooking foods other than pizza different elements may be used, depending on the foods cooking characteristics. The wattage output of the top elements is selected to provide a desired average number of watts per square inch at the cooking surface 38. The elements are selected to heat to full temperature within about 5 seconds after being turned on and cool down very quickly when power is removed. Residual heat is minimized so that the pizza does not continue to cook after the top elements are turned off. Cooking by the top elements is almost 100% infrared cooking with little or no convection cooking. This permits the cooking time by the top elements to be exactly controllable. The time the elements are on closely approximates, or is equal to, the cooking time. Thus, once the top elements are turned off the cooking of the top of the pizza stops and the visible top of the pizza cannot be burnt even if the pizza is not promptly removed from the oven.

Outer element 62 and inner element 64 are independently selectable depending on the type of pizza being cooked. Whether one or both of the top elements are used for a pizza type is selectable by the owner. He may program into the oven which elements should be used in cooking each pizza type according to desired cooking characteristics, after sample cooking tests. An example of this selection is that an owner may decide that for the type of pizza which is not cooked in a pan, it is preferred to use only outer element 62 when cooking. This provides the proper heat pattern across the whole pizza at the cooking surface to evenly cook the pizza. This also aids in browning the dough at the edge of the pizza. Inner element 64 is not turned on for pizza types not cooked in a pan. When a pizza is cooked in a pan having an edge, both elements 62 and 64 are used. However, the cooking temperature is significantly lower. This provides even browning of the edge of the pizza without burning. Other factors, such as size of pizza, thickness of pizza, etc., affect whether one or both elements are used in cooking the pizza.

A quartz glass 66 is disposed between the cooking surface 38 and the top cooking elements 62 and 64. This glass 66 permits infrared heat at the desired radiating temperature to pass therethrough. A top temperature sensor 68 is placed on or in close proximity to the glass surface 66 between the cooking elements and the glass at the center of the top surface. A suitable amount of insulation 70 is provided above the top cooking elements.

Figure 3:
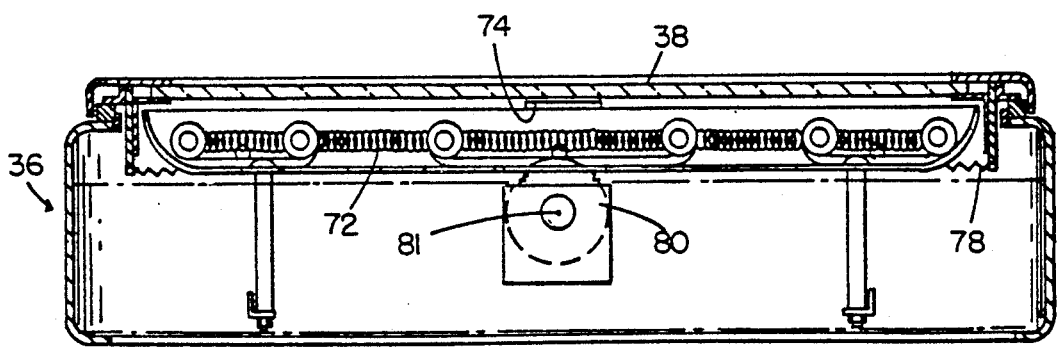
FIG. 3 is a cross-sectional view of a bottom section of an oven of the present invention.
Figure 5:
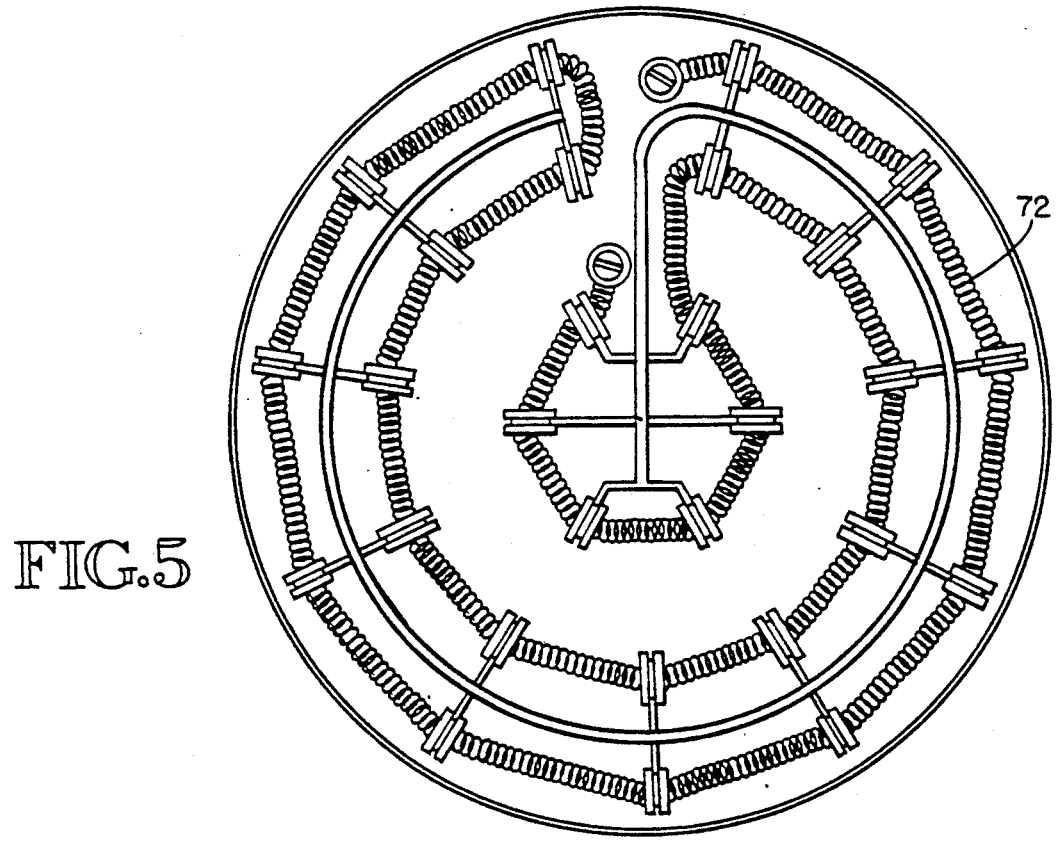
FIG. 5 is a top plan view of a bottom cooking element of the present invention.

The bottom portion 36 includes a cooking surface 38 and a bottom cooking element 72, as shown in FIGS. 3 and 5. The bottom cooking element cooks by infrared heat but is significantly closer to the cooking surface 38 than the top elements. The bottom element material has the same heating characteristics as the top element material. In the present embodiment, only a single cooking element is provided on the bottom. It has been determined that whether or not a pizza is in a pan does not alter the heat pattern from the bottom cooking element enough to require separate elements. If a pizza type did require two or more separate bottom cooking elements, this could be provided.

The cooking surface 38 is a quartz glass surface that permits infrared heat of the desired temperature to pass therethrough, similar to the top glass 66. A bottom temperature sensor 74 :s placed on or in close proximity to the glass 38 between the glass and the cooking element 72 to sense the temperature at that location and provide it to the electronic control unit. A suitable amount of insulation 82 is provided below the bottom cooking element.

Figure 6:
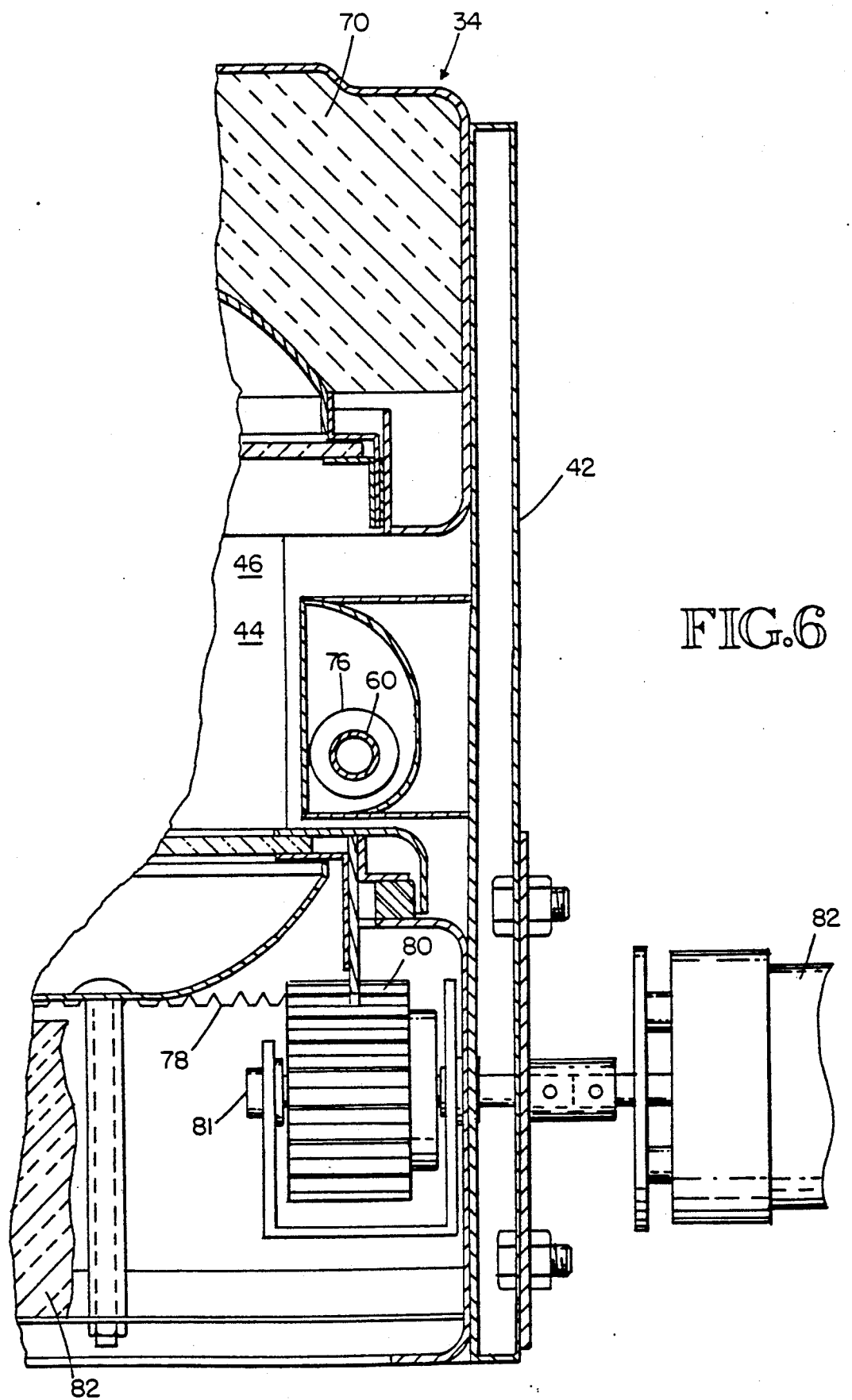
FIG. 6 is a partial cross-sectional view of a bottom section of the oven wherein the cooking surface is rotatable.
Figure 7:
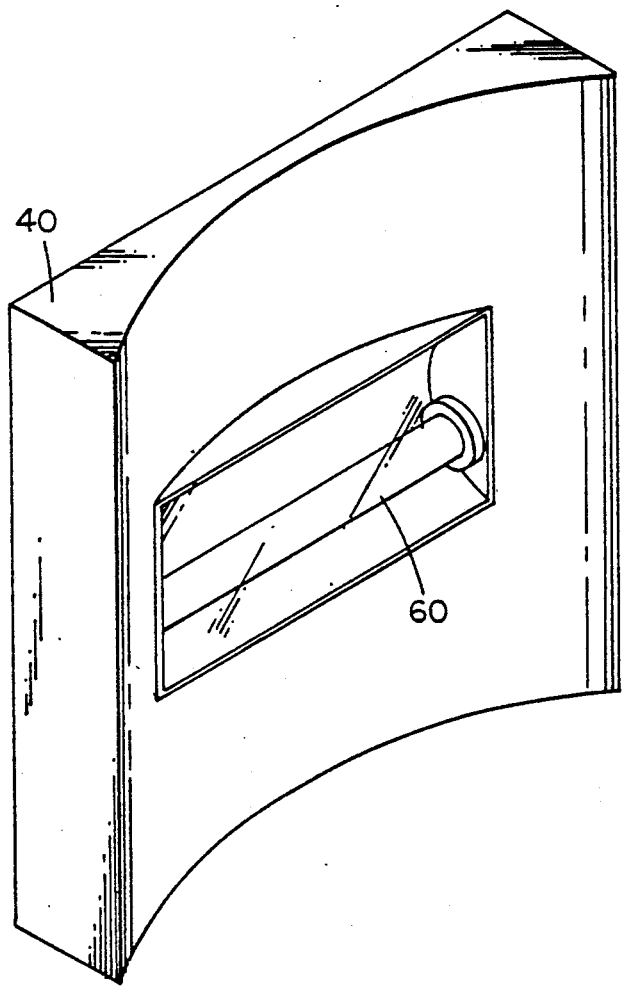
FIG. 7 is an isometric view of a side cooking element.

As shown in FIG. 6, if desired, the oven can be constructed to rotate the cooking surface 38 at a predetermined rate. For some pizza types, such as those having a metal screen but not a pan with edges, it is necessary to provide additional heat to brown and cook the edges of the dough. For this type of pizza, side cooking element 60 is provided together with a rotating cooking surface as shown in FIGS. 6 and 7. The cooking surface slowly rotates past infrared cooking element 60 which is within a glass quartz tube 76 to evenly brown and cook the edge of pizza. Teeth 78 extend circumferentially about the bottom portion 36 and are driven by gear 80 connected to drive motor 82 as shown in FIGS. 3 and 6. The speed at which the cooking surface rotates is sufficient to brown the edge of the pizza without burning it while the center of the pizza is cooked by the top and bottom elements.

Cooking Curve

Optimum cooking parameters for each type of pizza are determined and programmed into the electronic control unit. In determining the optimum cooking parameters for each pizza type, numerous pizzas of that type are cooked. The number of cooking elements used in cooking the pizza is varied, for example, use of one or two top elements or use of the side cooking element, to determine the combination of cooking elements that provides the optimum end product.

A cooking curve is determined for each type of pizza to be cooked in the oven. This is done as follows. The time to cook a particular pizza at a constant temperature is determined. This is done by pre-heating the oven to a known temperature and placing the pizza in the oven. The time to obtain a properly cooked pizza at this temperature is recorded. This procedure is performed at at least two separate temperatures. For best results, a relatively high temperature is used for one test and a relatively low temperature is used for a second test. The owner of the pizza oven, or other selected persons, determines when the pizzas are properly cooked to have the optimum qualities according to the standards that are deemed important. After the optimum cooking time at the desired temperature is determined for each element, the coefficients of the cooking curve are determined according to the following formulas.

$$t = \frac{M}{T - Ts} \qquad (1)$$

where t is the time to cook the same pizza, T is the cooking temperature, M and Ts are cooking curve coefficients to be determined from the test data.

Ts is solved from the data collected according to the following formula.

$$Ts = \frac{(t1 * T1) - (t2 * T2)}{t1 - t2} \qquad (2)$$

where t1 and t2 are the cooking times for the first and second cooking temperatures of T1 and T2, respectively, as determined from the cooking tests.

Solve for M using the following equation.

$$M = t*(T - Ts) \qquad (3)$$

where t, T and Ts have the values explained and determined above.

It is then necessary to measure the rate of temperature rise for each of the cooking elements being used. This is determined for each cooking elements. This is provided by the following formula.

$$\text{RATE} = \frac{T(\text{FINAL}) - T(\text{START})}{t} \qquad (4)$$

where T(FINAL) is the final temperature, T(START) is the start temperature and t is the time over which the measurement was taken.

The above data is programmed into the electronic control unit, along with other cooking parameters, as explained herein, to ensure that each pizza placed in the oven of that particular type is cooked the optimum amount to provide the desired end product.

An example of determining the cooking curves for cooking a pizza follows. Cooking tests are performed on a 14¼" pizza. Cooking times at particular temperatures are determined that produces a pizza having optimum taste, aroma, aesthetic appeal and other desired characteristics. Table I includes the data from the test.

TABLE I

| Top Cooking Element | | Bottom Cooking Element | |
|---|---|---|---|
| T | t | T | t |
| 500° F. | 16.0 Min | 400° F. | 19.0 Min |
| 600° F. | 9.0 Min | 500° F. | 10.0 Min |
| 700° F. | 6.25 Min | 600° F. | 6.75 Min |

After this data is collected, the cooking curves are then determined. The cooking curve for the top element is determined as follows. Using formula (2), Ts is calculated.

$$Ts = \frac{(16 * 500) - (6.25 * 700)}{16. - 6.25} = 371.8$$

Using formula (3), M is calculated.

$$M = 6.25*(700 - 371.8) = 2051.3$$

The two cooking parameters, Ts and M, for the cooking curve of the top element for this type of pizza are thus determined. The value of Ts is programmed into the electronic control unit. The value for M is determined from Ts by the electronic circuit and other cooking parameters. Using the above values, the optimum cooking time for a temperature of 600° F. can be determined using formula (1)

$$t = \frac{2051.3}{600 - 371.8} = 8.99 \text{ Minutes}$$

It can be seen that this agrees with the measured values.

The same formulas are used to determine the cooking curve for the bottom cooking element. Using the data collected and formulas (2) and (3) above yields Ts=290 and M=2094 for the bottom cooking element.

The cooking curves for the top and bottom elements for this example are shown in the graph of FIG. 7A. The cooking curves are not linear and the top and bottom cooking curves are different from each other for a single pizza. The cooking curves are significantly different for each type of pizza. The cooking curves for each type of pizza are determined by performing the high and low temperature cooking tests as described herein. The cooking curve values for each pizza type are programmed into the electronic control unit.

When cooking a pizza, the pizza is first placed in the oven on cooking surface 38. The type of pizza being cooked is indicated, such as by pressing one of the buttons 50 on control panel 32 corresponding to the type of pizza. The electronic control unit retrieves the cooking parameters for that pizza type. The temperature from each sensor is provided to the electronic control unit and the location of the start temperature on the cooking curve for that pizza type is determined when the pizza starts to cook. Each element in the oven may be at a high or low temperature when the pizza is placed and begins to be cooked. The oven is then heated at the proper temperature for the correct time at the correct duty cycle for each cooking element as explained herein. The microprocessor controls the cooking and indicates when the pizza is properly cooked.

The top and bottom cooking elements are each turned off when the cooking curve indicates that the pizza is fully cooked for the respective elements. Because infrared heat is used, the pizza does not cook significantly after the respective elements are turned off. Usually one element will be turned off before the other has reached the point on the cooking curve that indicates the pizza is done and should be removed from the oven. The oven does not indicate that the pizza is cooked until both elements have completed cooking the pizza according to their respective cooking curves. The cooking times and temperatures are arranged so that the top element is usually done first and will turn off while the bottom element continues to cook for a short period of time. However, depending on the previous pizza cooked in the oven and type of pizza now being cooked, either element may finish first and the oven will wait until both elements are finished before providing an indication that the pizza is done.

Each element is heated to a standby temperature when the oven is turned on and remains at the standby temperature at all times while waiting for a pizza to be placed in the oven. The standby temperature will usually be in the range of 300°-400° F. for the bottom element and 400°-500° F. for the top element, but may vary considerably. After a pizza is cooked and then removed from the oven, the oven begins to cool. The oven may cool only a few degrees before the next pizza is placed in the oven or the oven may cool over a hundred degrees, even down to the standby temperature, before the next pizza is placed in the oven depending on the delay involved.

The electronic control unit calculates the proper cooking time for each pizza according to the cooking curve and includes the starting temperature of the respective cooking element in determining the proper cooking time. The total time for a pizza to cook is equal to the time it takes to reach the cooking temperature plus the time remaining to cook at the cooking temperature. The amount of cooking of the pizza during the time taken to reach the final cooking temperature can be determined by using a nominal (or average) temperature to calculate the amount of cooking completed during the temperature rise portion of the cooking time. The nominal temperature is defined as a temperature between the beginning temperature and the final temperature. The nominal temperature is defined as a fraction of the difference, approximately 63%, between the beginning temperature and the final temperature. The nominal temperature is determined from the formula:

$$Tn = 0.63*(Tf - Tb) + Tb \qquad (5)$$

where Tf is the final temperature and Tb is the beginning temperature.

The amount of time, ta, it takes a particular cooking element to rise from a beginning temperature, Tb, to the final temperature, Tf, is determined using the RATE of formula (4).

$$ta = \frac{Tf - Tb}{RATE} \qquad (6)$$

where Tf and Tb are the same variables given above.

The amount of time, tn, it would take the pizza to cook completely at temperature Tn is given by formula (1) above, and shown below using the time and temperature coefficients used in calculating a nominal time:

$$tn = \frac{M}{Tn - Ts}$$

This permits the amount of cooking done to the pizza while the respective cooking element is heating up to be determined by a formula expressing the fraction of doneness, Fd:

$$Fd = \frac{ta}{tn} \qquad (7)$$

where ta and tn are the values calculated above.

The time remaining to cook at the final temperature is calculated from the following formula:

$$tr = (1 - Fd)*tf \qquad (8)$$

Where tr is the remaining time to cook at the final temperature Tf and tf is the time taken to cook the pizza if cooked the entire time at Tf according to the cooking curve.

The cooking time for any pizza placed in an oven having cooking elements at any given start temperature can easily be determined using the above formulas. A cooking time for the top element is calculated as an example. Assume that the top element is at a standby temperature of 400° F. and that the desired final temperature is 700° F. Using formula (5), this provides a nominal temperature Tn as follows:

$$Tn = 0.63*(700 - 400) + 400 = 589° F.$$

The time spent at Tn is determined from formula (6), the RATE having been measured previously according to formula (4) to be 60 degrees per minute:

$$ta = \frac{(700 - 400)}{60} = 5 \text{ min.}$$

The time it would take for the pizza to fully cook at Tn is determined from previous formula (3) using the values as previously determined for the 14¼" pizza of Table I for the top element:

$$tn = \frac{M}{Tn - Ts} = \frac{2051.3}{589 - 371.8} = 9.44 \text{ min.}$$

Calculating Fd from formula (7) yields $$Fd = \frac{5}{9.44} = .53 = 53\%.$$

In other words, the pizza is 53% cooked at the time the cooking coil reaches the final cooking temperature, according to the top element cooking curve for that particular pizza. It is then necessary to calculate the time remaining to cook at the final cooking temperature using formula (8) above:

$$tr = (1 - 0.53)*6.25 \text{ Min.} = 2.94 \text{ Minutes.}$$

The 6.25 minutes is taken from Table I for that pizza, previously however, the final cooking temperature could also be determined from the cooking curve. The total time to cook is equal to the time to reach the final temperature, ta plus the remaining time tr, yielding 5+2.94=7.94 min. It takes 7.94 minutes to cook the type of pizza in this example, assuming a starting temperature of 400° F. and a final cooking temperature of 700° F. The start temperature and cooking time will be different for each pizza cooked and will vary for each type of pizza but can be calculated for any type of pizza using the formulas and tests described herein.

It is important to note that the temperatures given are for the respective top and bottom temperature sensors located as shown in FIGS. 2 and 3. This is significantly less than the element temperature that will reach its stable radiating temperature of about 1400° F. very quickly. The sensors' temperatures are very close to the top and bottom pizza temperatures, respectively, though there will be some variation. The sensor receives heat from the glass, the element, the pizza and oven environment. If the sensors are placed at a different location in relation to the pizza, the readings may be different, but the equations given herein are still valid and could be used to calculate the required variables and cooking times. The ability to set the cooking parameters for the top element independent of the cooking parameters of the bottom elements provide a significant advantage in producing a higher quality pizza. The dough on the bottom may be uniform from pizza to pizza but the topping vary greatly. A top cooking curve that properly cooks sausage or anchovies may burn green peppers. The bottom element's cooking curve may be the same for each topping combination of a particular dough style while the top element's cooking curve is varied according to the toppings.

Variable Duty Cycle of Cooking Elements

A significant feature of the present invention is that the cooking coils are turned on and off according to a predetermined duty cycle. The oven is designed to lose significant heat so that it does not burn the pizza when the pizza is at the final cooking temperature. One advantage that this provides is that as the pizza begins to approach the final cooking temperature, the on time within the duty cycle of the cooking element becomes less. Varying the on time duty cycle aids to properly cook the pizza without burning it. When the amount of time the cooking element is turned on within the 22 second duty cycle varies, this creates a variable duty cycle. The variable duty cycle also ensure that the cooking element does not significantly overshoot the final cooking temperature. The rate of temperature rise of the cooking element slows down significantly as the final cooking temperature is approached by lowering the duty cycle. Another advantage of a variable duty cycle is that each pizza is cooked the same whether it is placed in a cool oven or a hot oven.

In a well insulated oven, such as is known in the prior art, the temperature may reach 700° F. and stay there for several minutes. A pizza placed in such a prior art well insulated oven while it is heating up receives significant radiant heat and is cooked because the element is on most of the time. After the oven is hot and a pizza is placed in the oven the pizza may remain in the oven for the same amount of time as the previous pizza but not be cooked the same and not be properly brown. This is because the prior art oven retained its heat and the cooking element did not come on during the entire time the second pizza was in the oven. Pre-heating the prior art oven to the final temperature helps to avoid this problem but significant differences between each cooked pizza still occur. For example, as pizzas are placed into and taken from the prior art oven, the thermostat will turn the oven on or off and cook each pizza somewhat differently from each other pizza. The present invention overcomes this problem in the prior art pizza ovens.

According to the present invention, the oven operates on a 22 second duty cycle. The amount of time the cooking element is on during this 22 second duty cycle is variable. For example, assume a bottom cooking element has a final temperature in the range of 700° F. to 750° F. When the sensor temperature is more than 40° F. less than the final temperature, the cooking element operates at a 100% duty cycle. This means that the cooking element is on 100% of the time during the 22 second duty cycle. When the sensor temperature is 40° F. below the cooking temperature the duty cycle changes to a 95% duty cycle. This means that for each 22 second cycle, the cooking element is on 20.9 seconds and off 1.1 seconds. The oven continues to heat up, though at a slower rate than at the 100% duty cycle. When the sensor temperature is 17° F. less than the final temperature, the duty cycle changes to an 86% duty cycle. That is, the cooking element is on for 18.9 seconds of the 22 second duty cycle. When the sensor temperature is 8.5° F. less than the final temperature, the duty cycle changes to a 54% duty cycle. When the cooking temperature is reached, the duty cycle changes to 40%. The duty cycle remains at 40% for the remainder of the cooking time. This means that the cooking element is on for 8.8 seconds and off for 13.2 seconds of every 22 second cycle. At this duty cycle for the bottom element, the oven should not heat up any further. The oven is designed to lose enough heat at the final temperature of about 700° F. so that even with a duty cycle of 40% the pizza temperature remains constant and the pizza is not burned. If the temperature rises more than 22° F. above the final temperature the cooking element is turned off until the temperature cools off. However, this should never happen with the oven as designed. The duty cycles for the top and bottom elements are given respectively in tables II and III.

TABLE II

| TOP ELEMENT | | |
|---|---|---|
| Temp. relative to final temp. | | Duty Cycle |
| From | To | 750°-700° |
| +22.5° F. | 0° F. | 45% |
| 0° F. | −8.5° F. | 86% |
| −8.5° F. | −17° F. | 91% |
| −17° F. | −40° F. | 95% |
| −40° F. | BELOW | 100% |

TABLE III

| BOTTOM ELEMENT | | |
|---|---|---|
| Temp. relative to final temp. | | Duty Cycle |
| From | To | 750°-700° |
| +22.5° F. | 0° F. | 40% |
| 0° F. | −8.5° F. | 54% |
| −8.5° F. | −17° F. | 86% |
| −17° F. | −40° F. | 95% |
| −40° F. | BELOW | 100% |

As can be seen from tables II and III, the duty cycle is lower as the final cooking temperature is approached. The final duty cycle is selected to be one that will cook the pizza the desired amount if maintained for the entire cooking period. The oven is then designed to lose heat at the proper rate so that it does not rise further in temperature at this duty cycle. For this reason the front and back are left open and no doors are placed on the oven. Further, some insulation that could be placed on the sides and above or below the oven is left off to permit the heat to be dissipated at the proper rate from the cooking element. The shape of the oven is designed to permit the desired duty cycle to maintain but not exceed the final cooking temperature of the pizza.

The duty cycle that will maintain a desired temperature is different for each final temperature. The lower the final temperature, the lower the required duty cycle to maintain that temperature. The top expected final temperature is 750° F. and the lowest expected final temperature is 400° F. To determine the duty cycle for maintaining each temperature range, at 50° F. increments, a duty cycle multiplier is provided. These increments are given in table IV.

TABLE IV

| Final Temp. Range (°F.) | | | |
|---|---|---|---|
| From | To | Top Multiplier | Bottom Multiplier |
| 700° | 750° | 1.00 | 1.00 |
| 650° | 700° | .93 | .93 |
| 600° | 650° | .87 | .87 |
| 550° | 600° | .81 | .81 |
| 500° | 550° | .75 | .75 |
| 450° | 500° | .68 | .68 |
| 400° | 450° | .62 | .62 |
| 350° | 400° | .50 | .50 |

The duty cycle values of Tables II and III are for a final temperature of 700°-750° F. The duty cycle values are multiplied by the multiplier values in Table IV to determine the desired duty cycle for any final temperature and the variable duty cycle as that temperature is approached. For example, assume the pizza to be cooked has a final cooking temperature for the bottom element of 610° F. This is in the range of 600°-650° F. By looking at the range of 600°-650° F. in Table IV it can be seen that the multiplier is 0.87. This means that the duty cycles shown in Tables III, which are for a final temperature of 700°-750° F., are multiplied by 0.87 to determine the duty cycle for a final temperature of 600° F.-650° F. In this example, with a final temperature in the range of 600°-650° F. the final duty cycle is 0.87 * 0.40=0.35, yielding a duty cycle of 35%. Similarly, as the final temperature is approached, the duty cycle given in Table III is multiplied by the appropriate multiplier. When the temperature rises to be within 40° F. of the final temperature the duty cycle is changed to 83%, which is given by 0.87 * 0.95. The duty cycle changes to 75%, which is 0.87 * 0.86, for temperatures that are between 85° and 17° less than the final temperature. At 8.5° F. less than the final temperature the duty cycle becomes 47% and at final temperature the duty cycle is 35%. For final temperatures in the range of 350°-400° F. the duty cycle is 0.5 or ½ of the duty cycle of final temperatures in the 700°-750° F. range. The duty cycle values can easily be calculated for the top and bottom element at each temperature range from the tables provided. For example, for a top element having a final cooking temperature of 675°, the final duty cycle is 0.93 times the duty cycle of Table II, 45%, yielding a final duty cycle of 42%. In the present oven the multiplier is the same for the top and bottom elements though in some oven designs this may vary.

In the embodiment where a side heating element 60 is used, the duty cycle for the side element is set at 45% for all temperatures, though this could be varied if desired.

The present invention provides significant cost savings in cooking pizza over previous pizza ovens. Each oven is designed to cook individual pizzas and only those ovens needed to cook a pizza are turned on. If no pizza is being cooked, all the ovens may be left off. Even when an oven is turned on but not cooking a pizza it is left at a much lower, steady temperature compared to a conventional oven. This avoids the expense of keeping the ovens at cooking temperature at all times during business hours. As soon as a pizza is cooked, the respective cooking elements are turned off or return to standby temperature, thus saving considerable energy. Even though the oven is designed to lose a specific amount of heat while cooking, significant energy savings are realized because energy is only used when actually cooking a pizza or at a low standby temperature. Since electric cooking elements are used to generate infrared energy to accomplish the cooking they can be heated up quickly to commence cooking from even an off condition compared to the time to heat up a conventional oven so it is ready to cook.

A graph of the cooking curves for the sample 14½" pizza is shown in FIG. 7A. Two cooking curves are shown, one for the top element and one for the bottom element. The cooking curves are not linear, as can be seen from the graph. The top cooking curve is distinctly different from the bottom cooking curve. The cooking time and temperature for each element to properly cook the pizza is located along the curve. When a pizza is placed in an oven, the temperature rises toward the final cooking temperature and the time in minutes to properly cook the pizza travels along the cooking curve. When the final temperature is reached, the point on the cooking curve, together with the time travelled along the cooking curve, determines the total cooking time of the pizza as explained herein. The cooking curves for each type of pizza are very different than for other types of pizzas.

The bottom cooking element usually has a different final cooking temperature than the top cooking element. The travel of the pizza along the top cooking curve will be different than along the bottom cooking curve. For example, it can be seen from FIG. 7A that, at a given temperature, the bottom element will cook quicker, that is, in fewer minutes, than the top element. It is often desired to have the bottom cooking element take a longer time to cook than the top cooking element, therefore, the final temperature, the start temperature or both temperatures, for the bottom element are set lower than for the top element. The duty cycle of the bottom cooking element may also be less than the duty cycle of the top cooking element.

The cooking curves as shown in FIG. 7A are calculated by the electronic control unit for each of the pizza types for which data has been programmed into the electronic control unit. The electronic control unit monitors the temperature and time throughout the entire cooking cycle and compares this with the cooking curve for that type of pizza to ensure that the pizza is properly cooked. The electronic control unit indicates that the pizza is done when both elements have properly cooked the pizza according to their respective cooking curves.

Electronic Control Unit

FIGS. 8 to 22 and 23A to 23D comprise the electronic control circuit of the present invention. FIGS. 23A to 23D comprise the interface board and FIGS. 8 to 22 comprise the microprocessor board. The pins have been labelled and the circuit diagram is sufficiently clear so that one of ordinary skill in the art could build the invention, given the function and description as contained herein. The interface board of FIGS. 23A to 23D will now be described in conjunction with the microprocessor board of FIGS. 8 to 22.

Each oven is provided with a series of potentiometers 100 as shown in FIG. 23A and 23B. These potentiometers are each 50 K ohms with 20 turns. Each potentiometer represents one cooking parameter for each cooking element per selection button. There are six potentiometers for each button selection and 4 selection buttons per oven. One potentiometer is used to select the top element final cooking temperature. A second potentiometer is used to select the bottom element final cooking temperature. A third potentiometer is used to select a cooking time .for the top element and a fourth potentiometer is used to select a cooking time for the bottom element. A fifth potentiometer is used to select a top element cooking curve parameter, Ts, and a sixth is used to select a bottom element cooking curve parameter, Ts. Each of the four selection buttons has six potentiometers associated therewith whose values are selected and set by the customer or according to the customers' requirements to produce the optimum pizza. Thus, each button will cook the pizza totally independent of the cooking curve associated with any other button. The customer selects the type of pizzas to be cooked by each button, whether large, small, combination, deep pan pizza, etc. Two additional potentiometers per oven are provided, one each for the top and bottom element standby temperatures. This is a total of 26 potentiometers per oven. A screw driver is used to set the potentiometers to the desired value.

Figure 8:
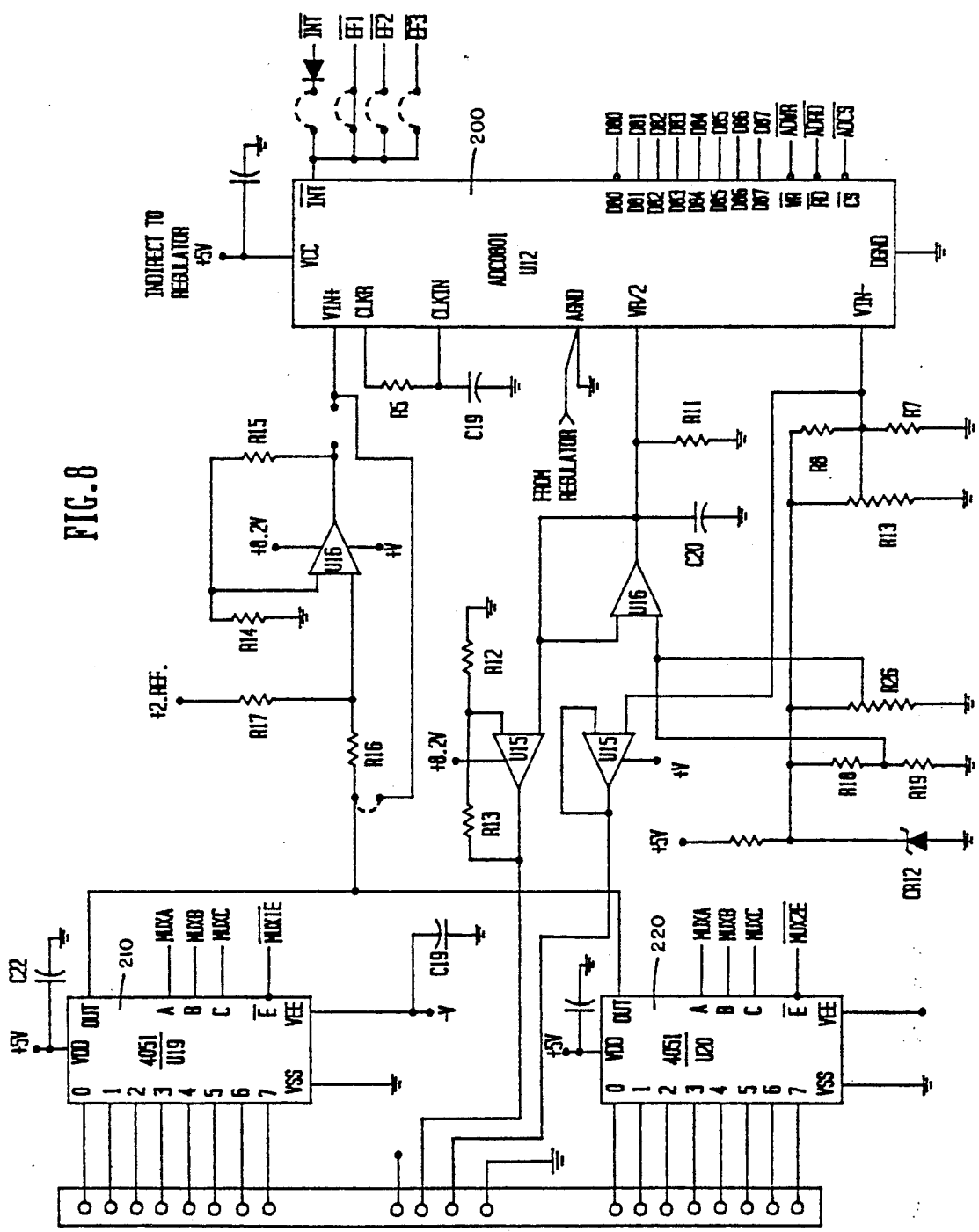
FIG. 8 is a schematic of the electrical connection of an analog-to-digital convertor and multiplexers used in the invention.
Figure 9:
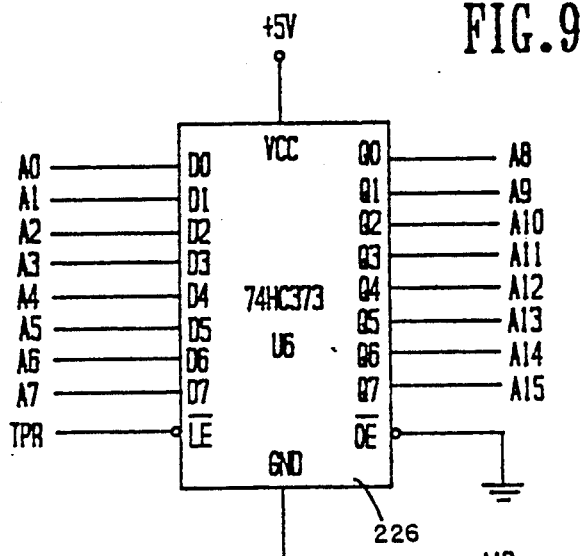
FIG. 9 is a schematic of the electrical connection of an address decoder and latch chip used in the invention.

In operation, a voltage is placed across the potentiometers and the voltage drop is provided to the analog to digital convertor, A/D, 200 through multiplexers 210 and 220 as shown in FIG. 8. Only 16 input pins are provided to multiplexers 210 and 220 of FIG. 8 but as there are at least 26 inputs from just one oven the data must be latched. The data provided into the multiplexers 210 and 220 is latched into various buffers and stored so that the remaining data may be brought into A/D 200.

Figure 12:
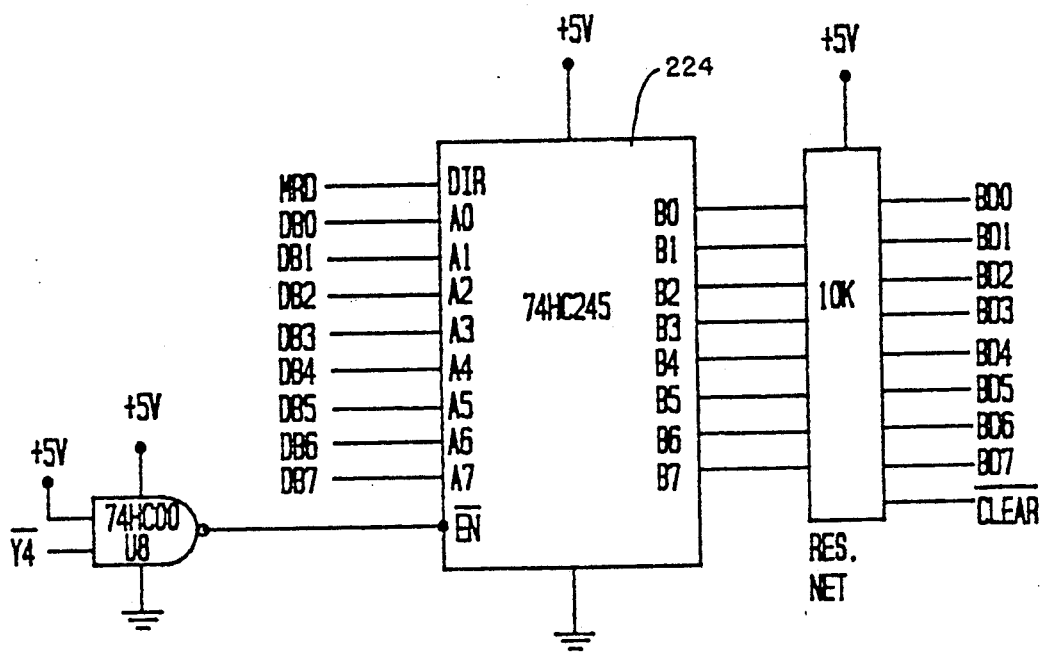
FIG. 12 is a schematic of the electrical connection of a memory buffer and decoder used in the invention.
Figure 13:
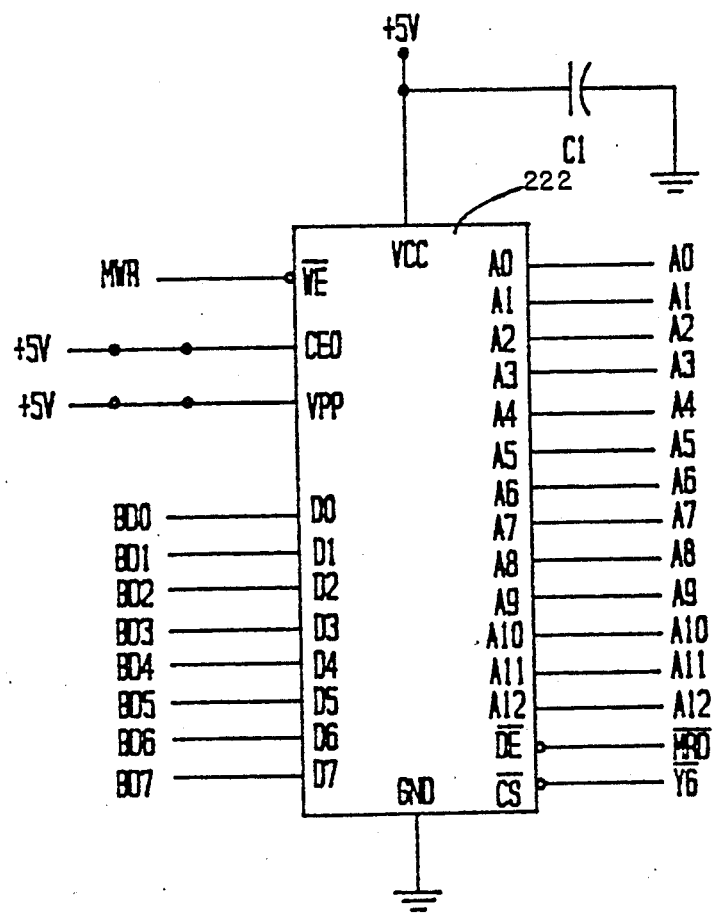
FIG. 13 is a schematic of the electrical connection of a memory device used in the invention.
Figure 15:
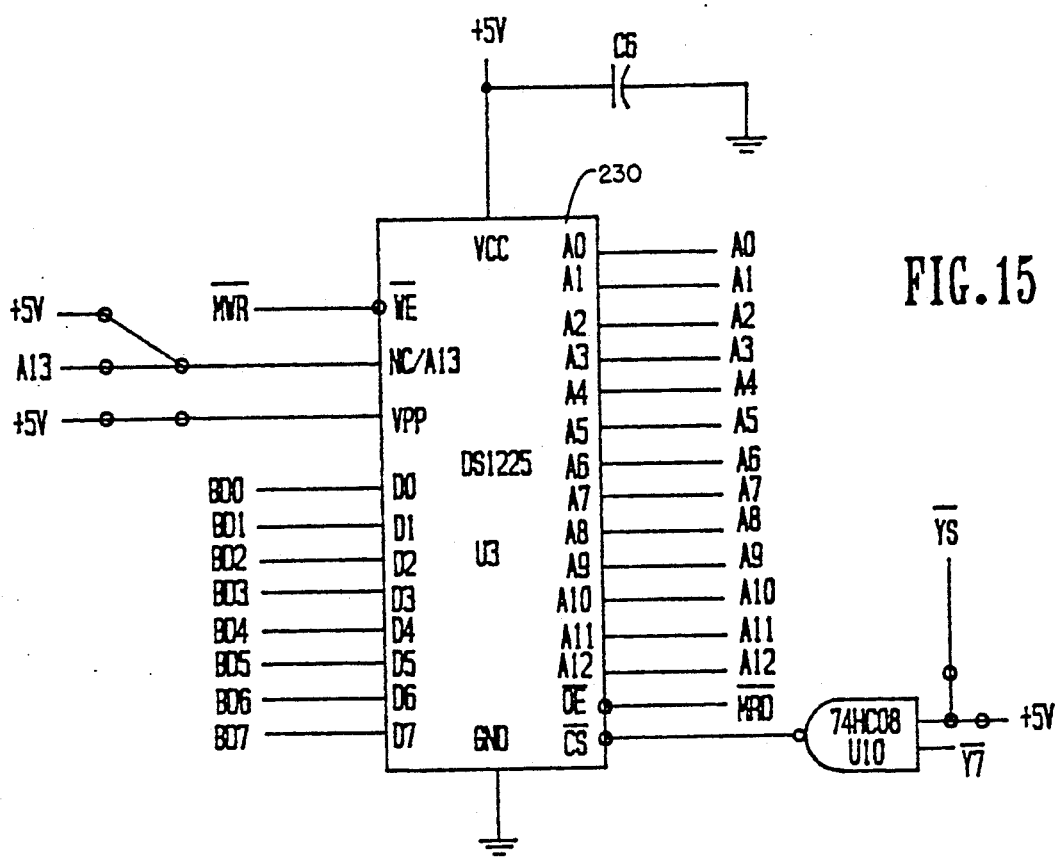
FIG. 15 is a schematic of the electrical connection of a memory device used in the invention.
Figure 16:
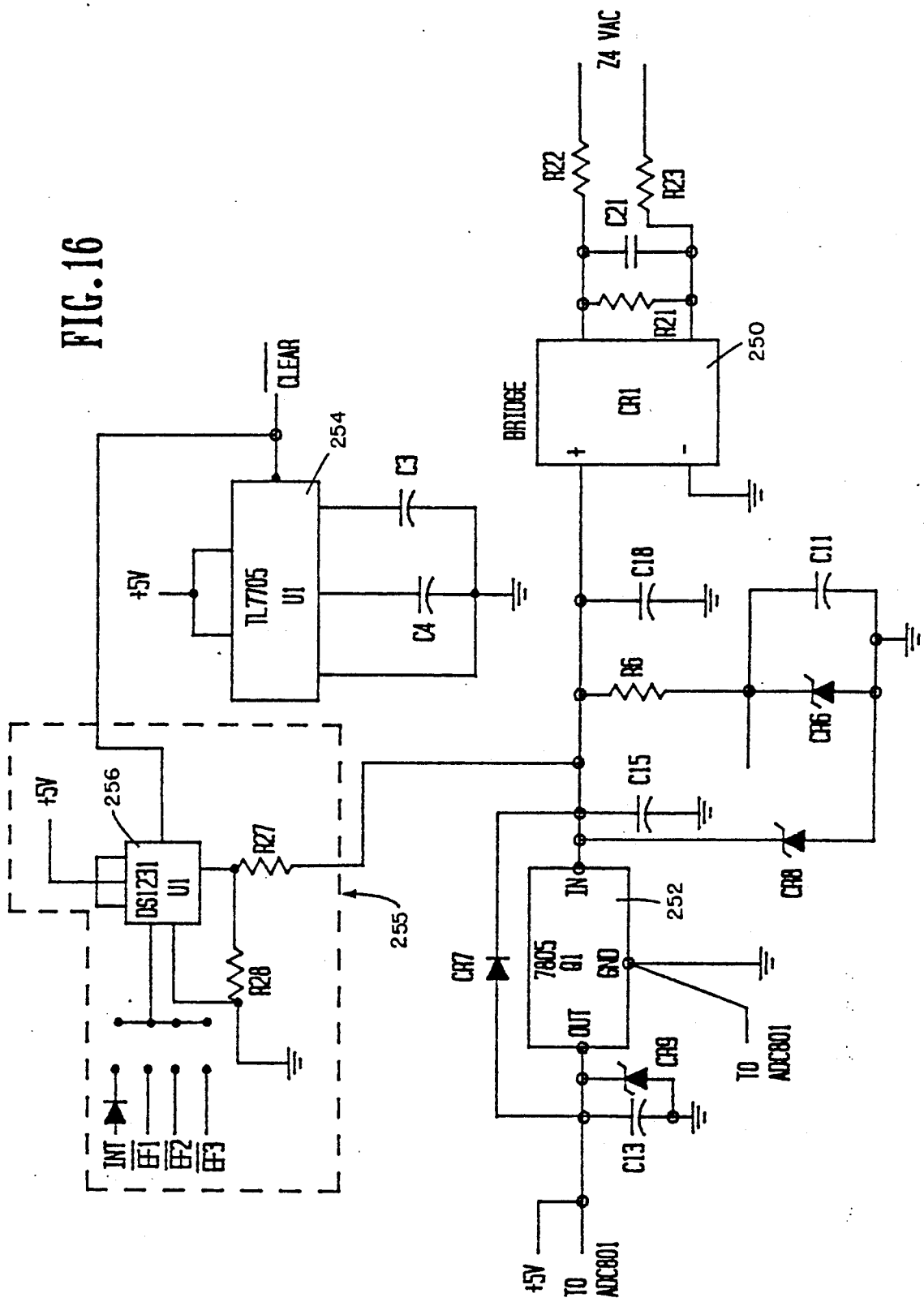
FIG. 16 is a schematic of the electrical connection of a power supply and voltage monitor circuit used in the invention.
Figure 19:
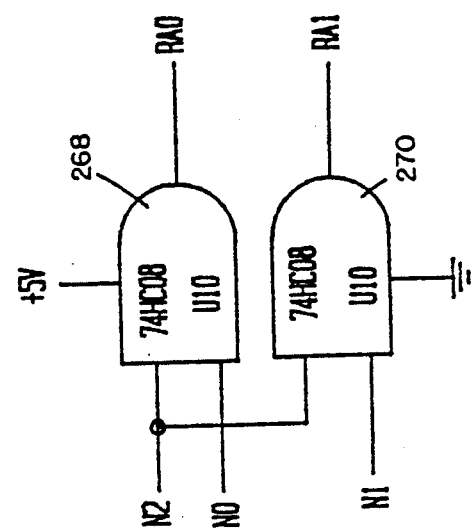
FIG. 19 is a schematic of the electrical connection of a logic circuit used in the invention.
Figure 17:
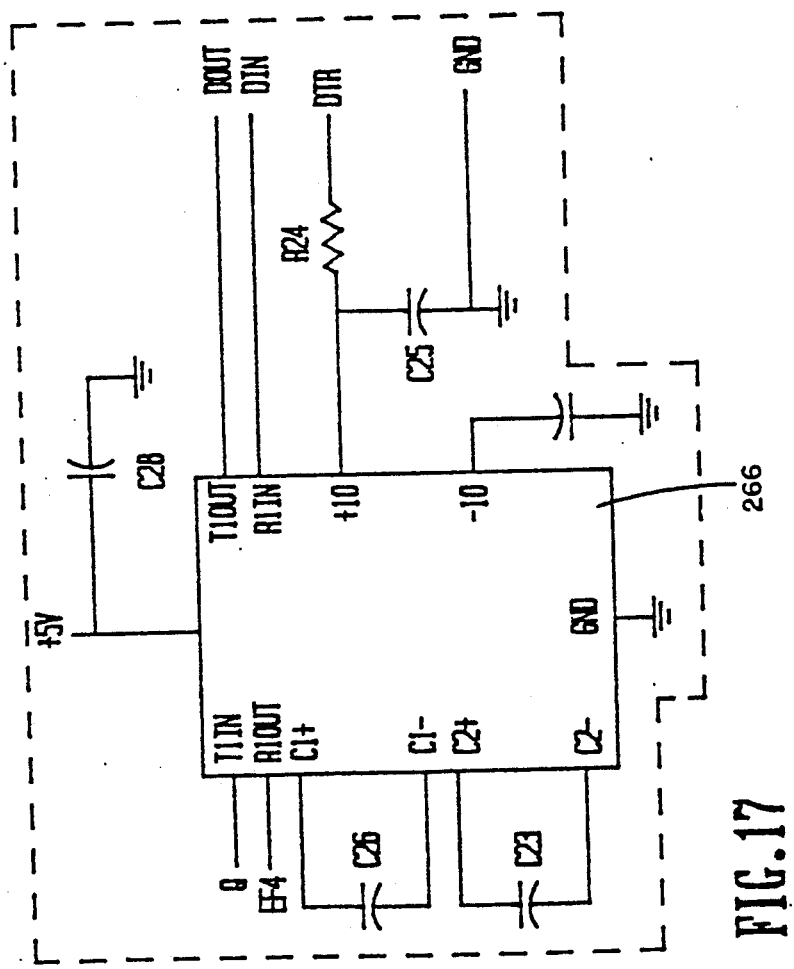
FIG. 17 is a schematic of the electrical connection of an RS 232 communication circuit used in the invention.
Figure 21:
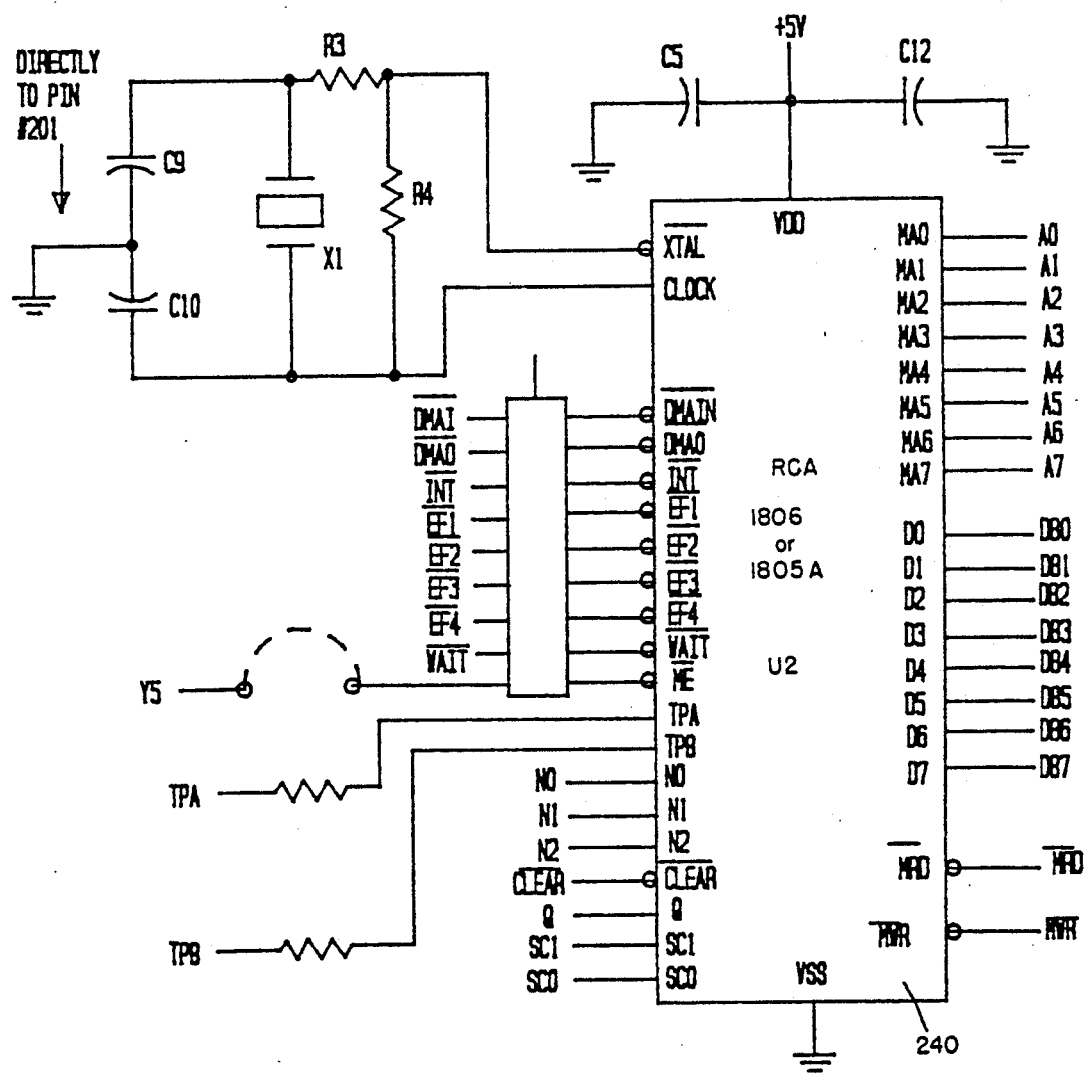
FIG. 21 is a schematic of the electrical connection of the microprocessor used in the invention.
Figure 23D:
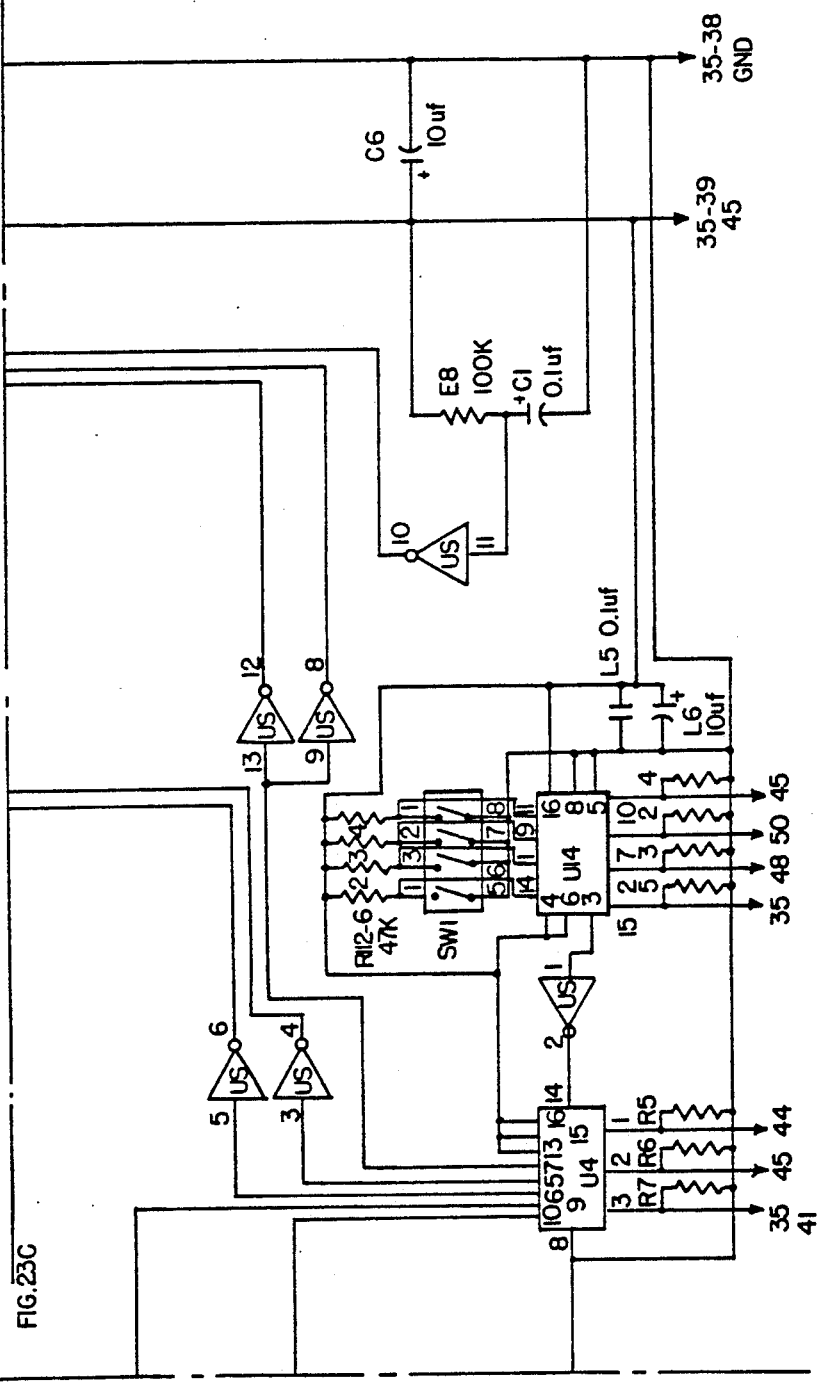

The A/D 200 of FIG. 8 converts the voltage from potentiometers 100 into a digital equivalent and provides it to memory devices 222 and 230 of FIGS. 13 and 15, respectively, by latching through address buffer 224 of FIG. 12, as can be seen from the pin connections. The data from the selected oven is also provided to microprocessor 240 as shown in FIG. 21. This microprocessor is an RCA 1805A but could easily be any microprocessor from the RCA 1800 family or any other desired microprocessor or computer. A person of ordinary skill in the art would be able to design this system using any microprocessor and associated control circuits and decoders, as desired. Switches 102 of FIG. 23C are decoded and provided to the microprocessor board to indicate which oven is connected to which location.

The microprocessor 240 is designed to control six ovens in its present configuration, each oven having four selection buttons. The selection buttons are connected to J2-2 through J2-8 as shown in FIG. 23C. When a button is selected this is decoded and sent to the microprocessor. The microprocessor then retrieves the cooking parameters from the appropriate oven for the top and bottom elements and calculates the cooking curves for each of the elements. The temperature sensors, coupled at J3-1 and J3-2 for the top and J4-1 and J4-2 for the bottom as shown in FIGS. 23A and 23B, are continuously addressed and read by the microprocessor. The cooking elements are controlled as described herein using the data from the temperature sensors as well as the program data stored by the setting of the potentiometers. Outputs J1-1 to J1-8 as shown in FIG. 23C go to the respective cooking elements. The cooking elements are controlled by the microprocessor according to the program and stored data, such as from the the potentiometers as has been described herein. The cooking elements are turned on and off under direct control of the microprocessor 240 of FIG. 21 through the appropriate control and decoding circuits.

A common voltage supply of 5 volts is provided to the interface board of FIGS. 23A–23D, including the potentiometers along with the microprocessor 240 and the A/D convertor 220. This voltage is provided from the circuit of FIG. 16 which has a 24 volt AC input to bridge rectifier 250 which provides an input to the 5 volt DC voltage regulator 252. In the event the voltage falls below 4.5 volts, clear circuit 254 sends a signal to the microprocessor that the data is not valid because the supply voltage is not within the accepted tolerance. Optional circuit 255 having chip 256 can be provided to send a signal indicating that the 24 V AC supply or other provided voltage is less than an acceptable value, and thus provide an early indication to the microprocessor that the voltage supply will likely soon become invalid. This gives the microprocessor additional time to store certain data and prepare for shutdown so that start up operation problems will be minimized. It is also possible, in response to a falling supply voltage, to place the cooking elements at a preset cooking temperature, such as 650° F. so that the ovens can continue to be used to cook pizzas, though without continuous monitoring and control. The microprocessor sends out the appropriate signals to the circuits when this clear signal is received. In response to a falling supply voltage, appropriate control signals to shut down all ovens are sent to all oven cooking elements. This safety control circuit ensures that in the event the data becomes invalid or the microprocessor is not receiving sufficient operating voltage the ovens will be placed in a safe condition prior to system shutdown and that certain stored data will not be lost.

A voltage comparison circuit is provided to compensate for the data read from the potentiometers when it is above 4.5 volts but varies slightly from the expected 5 volts. This ensures that accurate reading at the temperature sensors and potentiometers always occurs. Resistors 114 and 116 in FIG. 23A provide a voltage that is proportional to the supply voltage. This voltage is provided to microprocessor 240 through the appropriate decoders and A/D. The microprocessor 240 compares this voltage to a stored standard value either internally or from EPROM 220. The stored value is a digital value that provides a standard for comparison. This standard value will not vary even though the supply voltage is somewhat different than 5.00 volts so long as the microprocessor has sufficient operating voltage. If the voltage is slightly different from the stored standard value, either high or low, the microprocessor makes the appropriate compensation adjustment in all the voltages read from potentiometers 100 before calculating the cooking curves and in all other operating features using input voltages such as from the temperature sensors. This feature is useful because the supply voltage is rarely 5.000 volts at all times. The supply voltage may vary during a single cooking cycle or over several weeks. Power surges from heavy machinery being turned on or off may also affect the oven supply voltage. The digital standard provides comparison to the millivolt and adjustment to the data are made within the millivolt. Thus, if the supply voltage is 5.05 volts or 4.75 volts, etc. the oven will continue to operate properly in all respects and compensation will be made to all the values of the voltages appropriately. The microprocessor does this by adjusting the digital data rather than by changing the value of the voltages. This ensures that accurate data is provided to the control circuit even when the supply voltage varies considerably but is still within operating tolerances.

Figure 10:
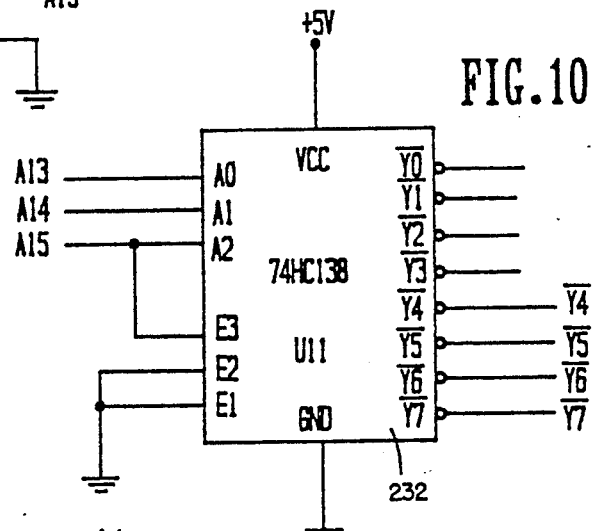
FIG. 10 is a schematic of the electrical connection of an address decoder and latch chip used in the invention.
Figure 11:
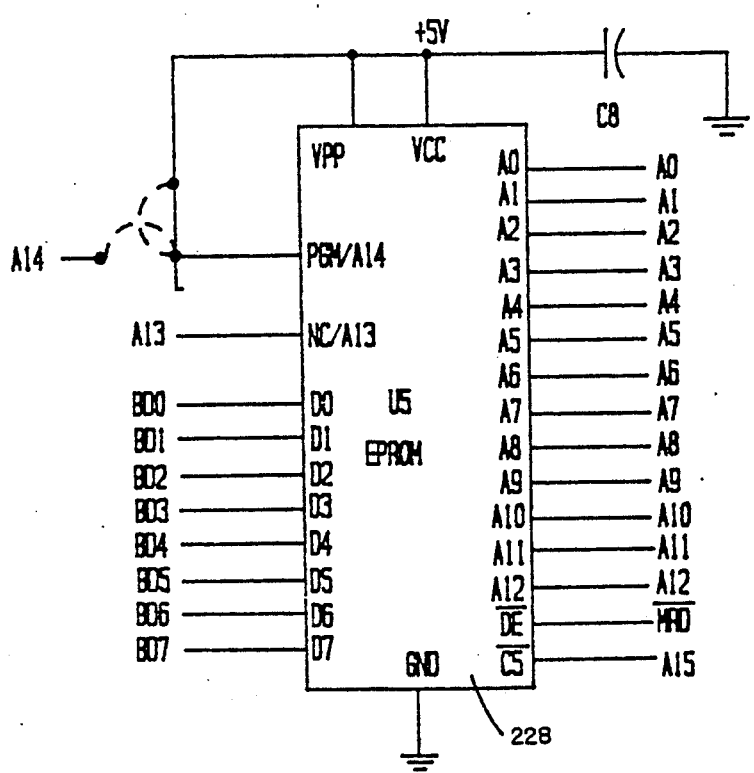
FIG. 11 is a schematic of the electrical connection of an EPROM used in the invention.
Figure 14:
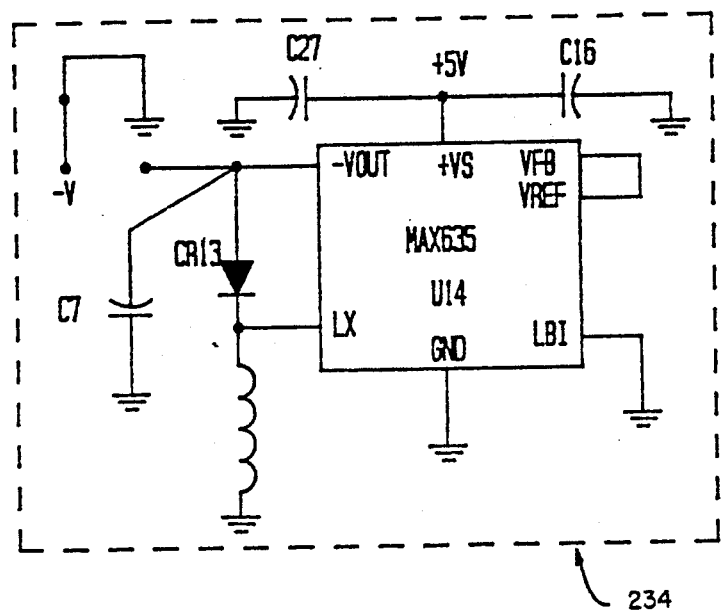
FIG. 14 is a schematic of the electrical connection of a voltage supply chip used in the invention.

Various program steps are stored in EPROM 228 of FIG. 11. This EPROM is coupled to the microprocessor as well as to other memory chips 224 and 230 and address decoder 226 of FIG. 9. The address decoder 232 of FIG. 10 is not used in the present embodiment with six ovens but can be used to provide an address buffer and decoding if a different circuit is being controlled or more ovens are being used. The circuit 234 of FIG. 14 provides a negative voltage supply to the circuits if needed. The microprocessor embodiment as shown herein does not require a negative voltage supply, but different microprocessors, logic circuits and control devices require negative voltages, and this circuit is provided in the event alternative systems are used on future designs.

Figure 18:
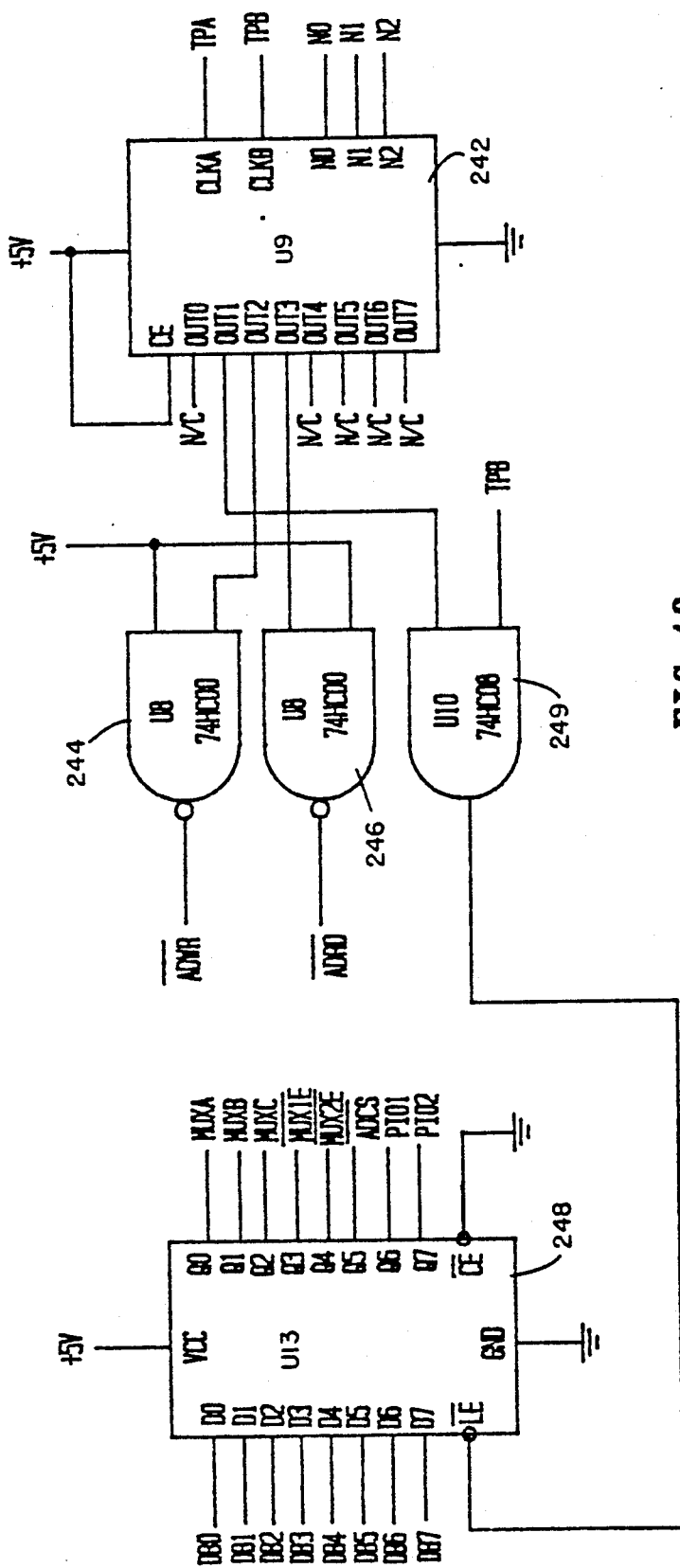
FIG. 18 is a schematic of the electrical connection of various logic circuits and a decoder used in the invention.
Figure 20:
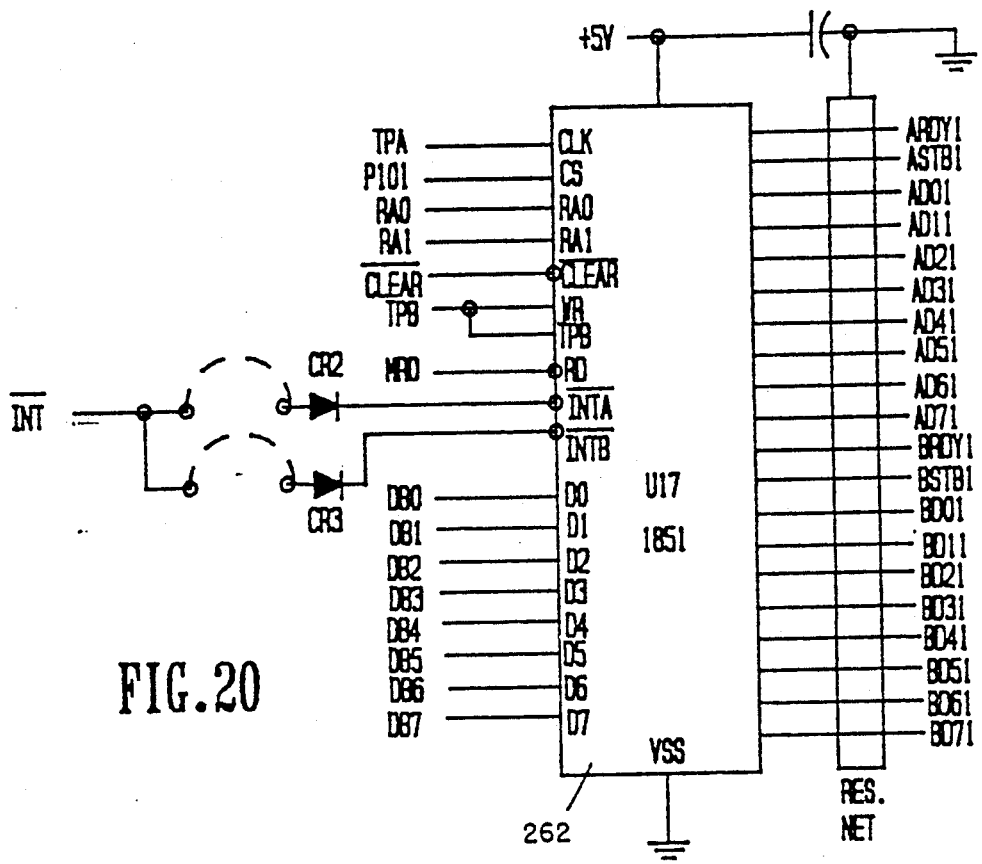
FIG. 20 is a schematic of the electrical connection of an interface chip used in the invention.
Figure 22:
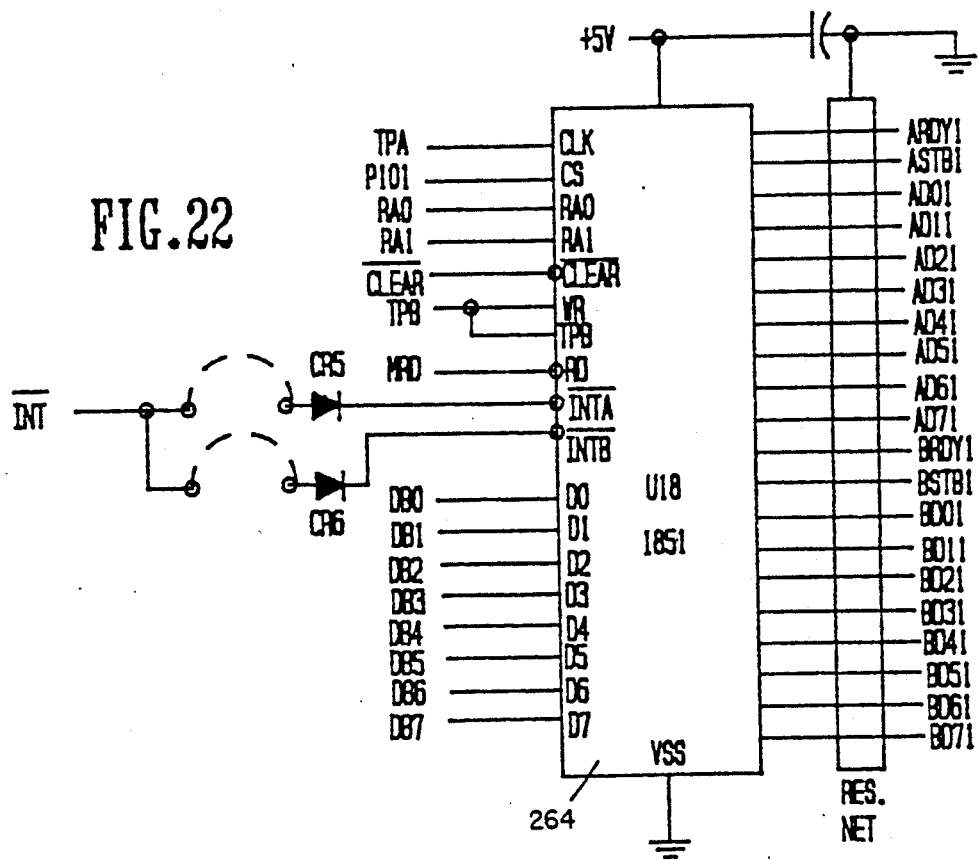
FIG. 22 is a schematic of the electrical connection of an interface chip used in the invention.

Logic circuit 241 of FIG. 18 receives timing and control pulses from the microprocessor 240. The timing and logic chip 242 sends a control signal to the A/D convertor 200 in response to signals from the microprocessor through NAND gates 244 and 246. Multiplexer and decoding circuit 248 receives timing and control signals through AND gate 249 to provide input to multiplexers 210 and 220 of FIG. 8.

Interface between the microprocessor board and the interface board is provided by decoder and logic chip 262. Logic chip 264 is similar to chip 262 but is not used in the present embodiment because of the simple design and few interconnections. If more ovens were controlled or additional interface, such as to another computer, were needed, then chip 264 is available for use for this purpose. Signals from the microprocessor, N0, N1 and N2 are provided to interface chip 262 through AND gates 268 and 270 of FIG. 19. Interface between the microprocessor and another system can be provided by an RS 232 circuit 266 of FIG. 17. The embodiment as described does not require connection to a separate computer system or down loading of data; however, it is contemplated that the cooking parameters as well the microprocessor control functions could be provided from an external source through an RS 232 circuit coupled to a computer or other system.

An electronic circuit and the ovens have been built, designed and tested to control the ovens and perform the calculations as described herein. This invention has been described with respect to the oven, the cooking elements, cooking curve and duty cycle. Reference has been made to controlling these with an electronic control unit. Given the invention as described, it would be possible to design and build many different ovens or electronic control units that would perform the desired function. The entire electronics could be hard-wired with no programming software used and, alternatively, the ovens could be connected to a computer, programmed from a keyboard and be totally software-controlled. The ovens could be made in a much simpler version using only a portion of the features described herein, such as, variable duty cycle used but not microprocessor controlled. Data stored in a digital memory could be used in place of the potentiometers. It is to be understood that the electronic control circuit as shown is designed to perform the desired function and that many other circuits could perform substantially the same function in substantially the same way to achieve the desired result. Any circuit which so operates to carry out the principles of this invention falls within the scope of this invention. While this invention has been described with respect to pizza, the apparatus and methods of cooking as described and claimed herein could be used for any food. For example, this oven could be made larger or smaller. It could be used to cook hamburger meat patties, chicken, fish, vegetables, lasagna, or numerous other foods. It could be made having a different shape, such as, square, rectangular, oval, etc. Two ovens have been shown one stacked on top of the other to provide significant space saving and convenience of operation. The ovens could be stand alone ovens or be stacked 3 or 4 high. The cooking curves for the respective foods could be determined using the formulas described herein. The same variable duty cycle could be used or an alternative duty cycle modified for that particular food.

We claim:
1. A method of cooking a food product comprising:
placing said food product in an oven having a programmable electronic controller;
sensing a beginning top temperature of said oven of said oven above said food product;
sensing a beginning bottom temperature of said oven below said food product;
heating said oven with the top cooking element to a final top temperature;
heating said oven with the bottom cooking element to a final bottom temperature;
measuring the time for said top temperature to reach said final top temperature;
measuring the time for said bottom temperature to reach said final bottom temperature;
calculating the remaining cooking time for said food product by said top and bottom cooking elements for said food product at each of said final temperatures using an equation that contains Ts that has been previously determined and stored according to the formula:

$$Ts = \frac{(t1 * T1) - (t2 * T2)}{t1 - t2}$$

where T1 is the first temperature at which said food product is cooked, t1 is the time for said food product to cook at said first temperature T1, T2 is a second, higher temperature, t2 is the time taken for said product to cook at T2, as previously determined, and * is a multiplication symbol, to determine a fraction of doneness of said food product achieved by cooking said food product during the time that said oven is heating up from said beginning temperatures to said final temperatures; and leaving said food product in said oven until said remaining cooking time has passed for both of said elements at said final temperatures, and removing said food product from said oven when said remaining time has expired.

2. The method according to claim 1 including the step of turning a top cooking element on and off according to a predetermined duty cycle at said final top cooking temperature.

3. The method according to claim 2 wherein an on time within said duty cycle is selected based on the value of said final cooking temperature.

4. A method of cooking a food product comprising:
cooking samples of a plurality of different types of said product to determine a set of optimum cooking parameters for each type of said product;
storing said cooking parameters in a programmable electronic control unit which controls an oven for cooking said different types of said product, at least one of said cooking parameters being Ts which is determined according to the formula:

$$Ts = \frac{(t1 * T1) - (t2 * T2)}{t1 - t2}$$

where T1 is a first temperature at which said product is cooked and t1 is the time for said product to cook at said first temperature T1 and T2 is a second, higher temperature and t2 is the time taken for said product to cook at T2 as determined during said step of cooking samples, and * is a multiplication symbol;
placing one type of said product in said oven;
providing an indication to said oven of the type of food product placed in said oven;
sensing a beginning top temperature of said oven above said food product;
sensing a beginning bottom temperature if said oven below said food product;
heating said oven with a top cooking element to a final temperature above said food product;
heating said oven with a bottom cooking element to a final temperature below said food product;
measuring a time for said top temperature to reach said final temperature;
measuring a time for said bottom temperature to reach said final temperature;
calculating a remaining cooking time for said food product at said respective final top and bottom temperatures based on said sensed beginning top and bottom temperatures, respectively, and the time taken for said oven to reach said final top and bottom temperatures, respectively, by determining a fraction of doneness of said food product achieved by cooking said food product during the time said oven heats from said respective beginning temperatures to said respective final temperatures; and
leaving said food product in said oven for said remaining cooking time at said final top and bottom temperatures to cook said food product until it is properly done.

5. The method according to claim 4 wherein storing said cooking parameters includes setting a plurality of potentiometers to a resistance which is propotional to said respective cooking parameters, said resistance value being used to determine a set of oven heating characteristics.

6. The method according to claim 4 wherein said heating steps include a duty cycle for said top cooking element and a variable duty cycle for said bottom cooking element.

7. A method of automatically cooking a food product in an oven having a programmable electronic controller comprising the steps of:
(a) cooking a sample of a selected food product at a first temperature until said sample of said selected food product is properly done;
(b) measuring the time taken to properly cook said sample of said selected food product at said first temperature;
(c) cooking a sample of said selected food product at a second temperature until said sample of said selected food product is properly done;
(d) measuring the time taken to properly cook said sample of said selected food product at said second temperature;
(e) determining a cooking curve for said selected food product using data obtained from steps a-d, said cooking curve including an indication of the time required to properly cook said selected food product using Ts determined according to the following equation:

$$Ts = \frac{(t1 * T1) - (t2 * T2)}{t1 - t2}$$

wherein T1 is a first temperature used in step a at which said product is cooked and t1 is the time measured in step b for said product to cook at said first temperature T1, T2 is a second, higher temperature used in step c and t2 is the time, measured in step d for said product to cook at T2 and * is a multiplication symbol;
(f) storing said cooking curve for said selected food product in said programmable electronic controller to permit a subsequent user to properly cook said selected product by placing said selected product in said oven and starting the cooking of said selected product; and
(g) placing said selected product in said oven and cooking said selected product until it is properly cooked by automatically controlling the oven heating characteristics according to said cooking curve.

8. The method according to claim 7, further including the steps of:
repeating steps a-g for a plurality of different selected food products; and
inputting to said oven controller which food product of said plurality is placed in said oven.

9. A method of cooking a selected food product comprising:
placing said selected food product in said oven having a programmable controller;
snsing a beginning temperature within said oven;
heating said oven with said food product therein from said beginning temperature to a final temperature;
measuring the time taken for said oven having said food product therein to increase in temperature from said beginning temperature to said final temperature;

calculating a remaining cooking time for said selected food product based on the beginning temperature, the final temperature, and the time taken for said oven temperature to increase from said beginning temperature to said final temperature; and using an equation that contains Ts having been previously determined and stored according to the formula:

$$Ts = \frac{(t1 * T1) - (t2 * T2)}{t1 - t2}$$

where T1 is the first temperature at which said food product is cooked, t1 is the time for said food product to cook at said first temperature T1, T2 is a second, higher temperature, t2 is the time taken for said product to cook at t2, as previously determined, and * is a multiplication symbol, to determine a fraction of doneness of said food product achieved by cooking said food product during the time that said oven is heating up from said beginning temperatures to said final temperatures; and removing said food product from said oven when said remaining cooking time has expired.

10. The method according to claim 9, further including the step of:

inputting an indication of the type of food product placed in said oven, said oven having stored therein a cooking curve for a plurality of different food products, said cooking curve being used to calculate a fraction of doneness and a remaining cooking time for respective food product given the beginning temperature, the final temperature and the time taken for said oven temperature to increase from said beginning temperature to said final temperature by determining the amount of cooking performed while said oven heats up from said beginning temperature to said final temperature.

11. The method according to claim 10 wherein said temperatures are approximately equal to a temperature of said food product.

12. The method according to claim 9 wherein said beginning temperature is an arbitrary temperature not selected or controllable by a user or by an electronic controller.

13. The method according to claim 9 wherein said oven includes a heating element and said heating element has a first power rate duty cycle at said beginning temperature and a second, lower, power rate duty cycle at said final temperature and the on time within said second, lower power rate duty cycle at said final temperature is selected based on the value of said final temperature.

14. The method according to claim 13 wherein the second power rate of said duty cycle has a high power rate for a final temperature which is a high value and a low power rate for a final temperature which is a low value.

15. The method according to claim 13 wherein said final power rate has a duty cycle of approximately 40% on time, 60% off time within a duty cycle for a given final temperature above 700°, and said final power rate has a duty cycle of approximately 35% on time and 65% off time within a duty cycle for a given final temperature of between 600° and 700°.

* * * * *

UNITED STATES PATENT AND TRADEMARK OFFICE
CERTIFICATE OF CORRECTION

PATENT NO. : 5,039,535

DATED : August 13, 1991

INVENTOR(S) : Howard A. Lang et al.

It is certified that error appears in the above-identified patent and that said Letters Patent is hereby corrected as shown below:

In column 19, claim 4, line 40, please delete "if" and substitute therefor -- of --.

In column 20, claim 9, line 62, please delete "snsing" and substitute therefor -- sensing --.

Signed and Sealed this

Sixteenth Day of February, 1993

Attest:

STEPHEN G. KUNIN

*Attesting Officer*  *Acting Commissioner of Patents and Trademarks*